United States Patent
Sutch et al.

(10) Patent No.: US 12,457,227 B1
(45) Date of Patent: Oct. 28, 2025

(54) GENERATING PARAMETERS FOR MALICIOUS ACTIVITY DETECTION USING DECISION TREES

(71) Applicant: Citibank, N.A., New York, NY (US)

(72) Inventors: Jeremy R. Sutch, Jacksonville, FL (US); Brett Power, Jacksonville, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/203,103

(22) Filed: May 8, 2025

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 6,519,580 | B1 * | 2/2003 | Johnson | G06F 16/30 707/E17.058 |
| 9,158,604 | B1 * | 10/2015 | Christodorescu | G06F 9/547 |
| 10,033,753 | B1 * | 7/2018 | Islam | H04L 63/1416 |
| 11,973,662 | B1 * | 4/2024 | Wang | H04L 41/122 |
| 12,212,583 | B2 * | 1/2025 | Du | H04L 63/1441 |
| 2004/0054505 | A1 * | 3/2004 | Lee | H04L 63/1466 702/186 |
| 2015/0379426 | A1 * | 12/2015 | Steele | G06N 5/025 706/12 |
| 2018/0248902 | A1 * | 8/2018 | Dãnilã-Dumitrescu | H04L 67/535 |
| 2019/0036946 | A1 * | 1/2019 | Ruvio | H04W 12/10 |
| 2020/0311559 | A1 * | 10/2020 | Chattopadhyay | G06N 5/01 |
| 2020/0382533 | A1 * | 12/2020 | Nabeel | H04L 43/045 |
| 2021/0232291 | A1 * | 7/2021 | Abdulaal | G06N 20/20 |
| 2021/0360024 | A1 * | 11/2021 | Zhang | H04L 63/1416 |
| 2023/0034820 | A1 * | 2/2023 | Muller | G06F 18/2113 |

(Continued)

OTHER PUBLICATIONS

Singh et al.; A Cyber-Physical Anomaly Detection for Wide-Area Protection Using Machine Learning; IEEE (Year: 2021).*

(Continued)

*Primary Examiner* — Kambiz Zand
*Assistant Examiner* — Mahabub S Ahmed
(74) *Attorney, Agent, or Firm* — Perkins Coie LLP

(57) ABSTRACT

Systems and methods for generating parameters for detecting malicious activity using decision trees are disclosed herein. The system generates parameters using a decision tree having predictor features and a target feature. The system generates, in near real time as messages are received, outputs for the target feature based on the parameters. The system determines, after a period of time, that a primary value of a primary external metric exceeds a primary threshold. The primary value may be indicative of the outputs having insufficient accuracy. The system determines a new decision tree that includes predictor features relating to the primary external metric. The new decision tree may also generate outputs that indicate that the primary value of the primary external metric is less than the primary threshold. The system generates new parameters using the new decision tree and uses the new parameters to generate new outputs for the target feature.

20 Claims, 10 Drawing Sheets

(56) References Cited

U.S. PATENT DOCUMENTS

| | | | |
|---|---|---|---|
| 2023/0091610 A1* | 3/2023 | Tamazlykar | G06N 3/08 |
| | | | 706/11 |
| 2023/0385735 A1* | 11/2023 | Ghosh | G06Q 10/0635 |
| 2024/0022593 A1* | 1/2024 | Costa | H04L 63/1425 |
| 2024/0089270 A1* | 3/2024 | Razinskas | H04L 63/1416 |
| 2024/0095662 A1* | 3/2024 | Xiao | H04L 41/16 |
| 2024/0422190 A1* | 12/2024 | Parinov | H04L 63/1416 |
| 2025/0039698 A1* | 1/2025 | Wu | H04W 24/02 |
| 2025/0063058 A1* | 2/2025 | Yang | G06N 3/0442 |
| 2025/0071027 A1* | 2/2025 | Bakshi | H04L 41/16 |
| 2025/0150478 A1* | 5/2025 | Coull | H04L 41/22 |
| 2025/0173431 A1* | 5/2025 | Mon Divakaran | G06F 21/552 |

OTHER PUBLICATIONS

Marschalek et al.; Classifying malicious system behavior using event propagation trees; ACM (Year: 2015).*

Dong et al., MBTree: Detecting Encryption RATs Communication Using Malicious Behavior Tree; IEEE (Year: 2021).*

* cited by examiner

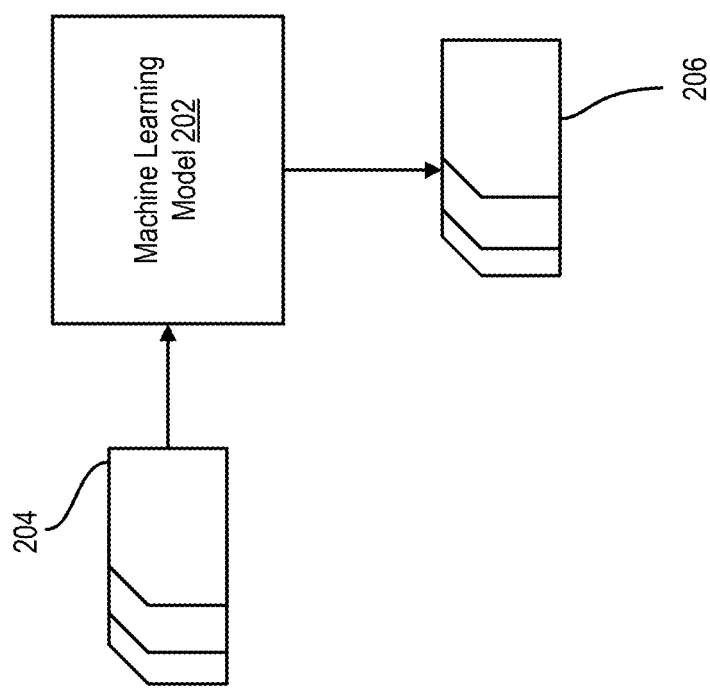

| 402 | Feature 404 | Feature 406 | Feature 408 | Target Feature 410 | Target Feature Label 412 |
|---|---|---|---|---|---|
| Message 414 | 10 | Account | 25/day | Not Malicious | Not Malicious |
| Message 416 | 101 | Authentication | 150/day | Malicious | Malicious |
| Message 418 | 14 | Authentication | 39/day | Not Malicious | Malicious |

FIG. 4

GENERATING PARAMETERS FOR MALICIOUS ACTIVITY DETECTION USING DECISION TREES

BACKGROUND

Decision trees are a type of machine learning model that may be used to make predictions or classifications based on input data. The structure of a decision tree may resemble a flowchart, where each internal node may represent a decision based on a specific feature and each branch may correspond to the outcome of that decision. The leaves of the tree may indicate the final output or class label. Decision trees may be applied to a variety of tasks, and their interpretability may make them useful for understanding how decisions are made.

Neural networks are a type of machine learning model that may be used to recognize patterns or make predictions based on input data. The structure of a neural network includes layers of interconnected nodes, where each node performs a mathematical operation on the data it receives. These networks may learn complex relationships by adjusting the connections, or weights, between nodes during training.

SUMMARY

Generating accurate and effective rules for detecting malicious activity in message streams may present significant technical challenges. The inherent complexity of message content, combined with the evolving tactics of malicious actors, may make it difficult to ensure that detection rules are both comprehensive and precise. If detection rules are too broad or over-inclusive, they may result in a high rate of false positives, causing legitimate messages to be incorrectly flagged as malicious. This, in turn, may create downstream inefficiencies, such as increased traffic for support systems, as users seek to resolve issues related to their falsely blocked messages. Conversely, if the rules are too narrow or under-inclusive, genuine malicious activity may go undetected, exposing the system to security risks and potential harm. The dynamic nature of messaging environments further complicates this process, as changing conditions and emerging threats may necessitate frequent adjustments to detection parameters to maintain an optimal balance between security and usability.

Traditional approaches to rule generation for malicious activity detection may rely on static or manually crafted rules or threshold-based mechanisms. While these methods may be straightforward to implement, they often fail to account for the nuanced and context-dependent nature of malicious behavior. For example, a static rule that blocks all messages based on certain location radiuses may inadvertently block benign messages during an emergency situation, leading to safety concerns. Additionally, such rules may not adapt well to new or evolving attack patterns, resulting in gaps in coverage. The challenge is further compounded by the need to dynamically adjust the restrictiveness of the rules in response to external metrics, such as the observed rate of false positives or the detection of new threats. Without a mechanism for continuous adaptation, static rule-based systems may quickly become either too permissive or too restrictive, undermining their effectiveness in real-world scenarios.

To address these challenges, the disclosed system may employ decision trees to generate detection rules based on relevant predictor features for identifying malicious activity. The system may generate rules based on the decision trees and may use the rules to determine whether messages are malicious. The system may select an initial decision tree and derive a set of rules (e.g., parameters) from it, which are then applied to incoming messages. If external metrics indicate that the current rules are not sufficiently restrictive (e.g., there is a rise in undetected malicious activity), the system may generate a new, more restrictive decision tree and derive new rules therefrom to enhance detection. If the new rules result in an excessive number of false positives, as indicated by user complaints or support system metrics, the system may update the decision tree to relax the rules and reduce unnecessary disruptions. This iterative process allows the system to dynamically calibrate its detection parameters, ensuring that the rules remain both effective and responsive to changing conditions. If an updated decision tree is validated, the system may continue to use the updated parameters generated from the updated decision tree to determine malicious messages and take actions based on the determinations, such as accepting or blocking certain messages.

In particular, the system may generate a plurality of decision trees using a plurality of predictor features to determine a target feature. Each decision tree may be constructed to determine the target feature but with a unique sequence or combination of the available predictor features. For example, one decision tree might first evaluate the frequency of messages from a sender before considering the presence of suspicious keywords, while another tree might prioritize the analysis of message content before assessing sender behavior. By generating a plurality of decision trees in this manner, the system may explore different pathways for detecting malicious activity, increasing the likelihood of identifying the most effective set of rules for distinguishing between legitimate and malicious messages. In some embodiments, the system may generate a decision tree for every possible combination and ordering of the available predictor features, thereby exhaustively exploring all potential ways to determine the target feature.

In some embodiments, the system may select a preferred decision tree from among the decision trees it has generated using different combinations and orders of the predictor features. This selection may be based on specific criteria, such as which decision tree most accurately determines the target feature (e.g., the malicious nature of messages) while minimizing false positives and false negatives. For example, if one decision tree consistently flags actual malicious activity without incorrectly blocking legitimate messages, the system may choose this tree as the initial preferred model. Once the preferred decision tree has been selected, the system may generate a set of parameters based on this decision tree, where these parameters may be used to determine the target feature. These parameters may be based upon thresholds, feature splits, or decisions that define how input data is evaluated at each node of the decision tree. For example, the parameters may specify that if the message frequency exceeds a certain value and the sender reputation falls below a particular threshold, the message is to be classified as malicious. The system may use the parameters generated from the preferred decision tree to determine malicious messages and take actions based on the determinations, such as accepting or blocking certain messages.

The system may generate, in real time or near real time and for a plurality of messages as each message is received, a set of outputs for the target feature based on the set of parameters derived from the preferred decision tree. As each new message arrives, the system may immediately extract relevant features from the message, such as sender information, message content, frequency, or other contextual data. The extracted features may then be evaluated against the parameters—such as decision rules, thresholds, or feature splits—that were previously generated from the preferred decision tree. For example, the system may check if the message content contains certain keywords, if the sender's reputation score falls below a specified threshold, or if the message frequency exceeds a predefined limit. Based on these evaluations, the system may generate an output for each message, such as a probability score or a binary classification, indicating whether the message is likely to exhibit the target feature, such as being malicious or benign.

After a period of time, the system may determine that a primary value of a primary external metric exceeds a primary threshold. This primary value may be indicative of the set of outputs having an accuracy level that is insufficient. For example, the system may monitor an external metric, such as the amount of undetected malicious messages within the system for a time period. If, over time, the observed value of this metric surpasses a predefined threshold—such as the undetected malicious messages reaching a value that is higher than what is considered acceptable—the system may interpret this as evidence that the current parameters are not restrictive enough. This determination may prompt the system to consider further actions, such as retraining the model or adjusting the parameters, in order to improve the accuracy and reliability of future outputs.

In response to identifying that the primary external metric has exceeded the threshold, the system may determine a set of predictor features that are related to this metric. This may involve analyzing recent outputs to identify which specific features of the messages are most closely associated with an increase in the primary external metric, such as the rate of undetected malicious messages. For example, the system may examine whether certain characteristics—like message content, sender behavior, time of delivery, or frequency of similar messages—tend to appear more frequently in cases where the parameters fail to capture malicious messages. By isolating these predictor features, the system may gain a better understanding of the factors that contribute to the performance issues. These predictor features may be used to update the decision tree or select a new decision tree in order to generate new parameters that are more restrictive.

For example, the system may determine a new decision tree that incorporates the set of predictor features previously identified and for which a new set of outputs for the target feature, when generated by this new decision tree, is associated with the primary value of the primary external metric falling below the primary threshold. This may involve using the selected predictor features during the construction of the decision tree, ensuring that the decision tree is focused on the most relevant aspects of the data that influence the external metric, such as the rate of undetected malicious messages. The system may generate a new plurality of decision trees using every possible ordering of the set of predictor features and select a new decision tree from among the new plurality of decision trees.

The system may generate, using the new decision tree, a new set of parameters that may be used to determine the target feature. This may involve determining the structure and rules of the newly constructed decision tree to determine updated thresholds, split points, or decision criteria that define how the model determines the target feature. Once these parameters have been established, the system may also generate, in real time or near real time and for a new plurality of messages as each message is received, a new set of outputs for the target feature based on the new parameters. If the new set of outputs is associated with the primary value of the primary external metric (e.g., the rate of undetected malicious messages) falling below the primary threshold, the system may continue to process messages using the new set of parameters. The system may use the new parameters generated from the preferred decision tree to determine malicious messages and take actions based on the determinations, such as accepting or blocking certain messages.

In some embodiments, the system may determine that a dependent value of a dependent external metric, such as traffic in a support system, has increased, where this dependent value is associated with the new set of outputs for the target feature generated by the new decision tree. As an illustrative example, if the dependent external metric (e.g., support system traffic) is inversely related to the primary external metric (e.g., the rate of undetected malicious messages), the system may need to carefully balance the restrictiveness of its detection rules. For example, if the new parameters are too restrictive, they may cause an increased number of legitimate messages to be incorrectly flagged as malicious, which in turn may lead to a surge in user inquiries or complaints to the support system. The system may determine that the value of this dependent metric has exceeded a dependent threshold and that corrective measures must be taken.

The system may generate an updated decision tree by adjusting one or more values of one or more predictor features from the set of predictor features used in the new decision tree. This updated decision tree may be designed to satisfy a dependent requirement, such that an updated set of outputs from the updated decision tree is associated with the dependent value—such as support system traffic—being less than the dependent threshold. For example, if the new decision tree uses a low threshold for message frequency as a predictor feature, causing many legitimate users who send frequent messages to be incorrectly flagged as malicious, the system may increase this threshold in the updated decision tree. As a result, fewer legitimate messages may be blocked, which may lead to a decrease in support system traffic as users encounter fewer false positives and submit fewer complaints. By fine-tuning the predictor feature values, the system may reduce the number of false positives, thereby lowering support traffic, while still maintaining effective detection of malicious activity.

The system may generate, using the updated decision tree, an updated set of parameters for generating an updated set of outputs for the target feature. These parameters may incorporate revised thresholds, feature splits, or decision rules that reflect the adjustments made to the predictor features in the updated decision tree. As each new message is received, the system may apply the updated parameters in real time or near real time to generate an updated set of outputs for the target feature, such as classifying each message as malicious or benign. For example, after increasing the threshold for message frequency in the updated decision tree, the system may use this new threshold to evaluate incoming messages, resulting in fewer legitimate messages being flagged as malicious.

Based on the updated set of outputs generated by the updated parameters satisfying both the primary requirement—such as reducing the rate of undetected malicious messages below the primary threshold—and the dependent requirement—such as keeping support system traffic below the dependent threshold—the system may continue using the updated parameters for further processing of messages. This helps to ensure that the balance between security and user experience is maintained. By using the updated parameters when both requirements are met, the system may ensure that malicious activity detection remains effective against malicious actors while minimizing unnecessary disruptions for legitimate users.

To further address the aforementioned technical challenges with malicious activity detection, the disclosed system may employ neural networks from which to generate detection rules based on relevant predictor features for identifying malicious activity. The system may generate a set of parameters based on the weights extracted from a trained neural network and may use these parameters to determine a target feature of messages, such as being malicious. The system may select a plurality of predictor features from historical data and train the neural network to predict the target feature, extracting a set of weights that inform how incoming messages are evaluated. If external metrics indicate that the current parameters are not sufficiently accurate—such as when the rate of undetected malicious messages exceeds a predefined threshold—the system may identify which predictor features are contributing to the issue and may generate and train a new neural network using these features. The system may then extract a new set of weights and generate updated parameters, which are applied to incoming messages to enhance detection. If the updated parameters result in an undesirable increase in false positives or other dependent metrics, the system may further adjust the neural network or the predictor features to relax the parameters and reduce unnecessary disruptions. This iterative process allows the system to dynamically calibrate its detection parameters, ensuring that the neural network-based rules remain both effective and responsive to changing conditions. If the updated parameters are validated, the system may continue to use them to determine the target feature in new messages and take appropriate actions, such as accepting or blocking certain messages.

In particular, the system may select a plurality of predictor features for training a neural network to predict a target feature, where the selection of these predictor features may be based on a historical dataset that indicates the contributions of various features to values of the target feature. For example, the system may analyze past data to determine which features—such as sender reputation, message content, or frequency—have historically been the strongest indicators of whether a message is malicious. By leveraging this historical insight, the system may ensure that the most relevant and influential predictor features are included in the training process, thereby increasing the likelihood that the neural network will accurately predict the target feature.

Once the relevant predictor features have been selected, the system may train the neural network using a training dataset, where the neural network may learn to predict the target feature based on the selected predictor features. During training, the neural network may adjust its internal parameters, such as weights and biases, to minimize prediction errors and improve its ability to distinguish between different classes of messages. This process may involve multiple iterations, with the system evaluating the neural network's performance on validation data and making adjustments as needed to optimize accuracy and generalization.

After the neural network has been trained, the system may extract a plurality of weights corresponding to a plurality of layers within the neural network. These weights may represent the learned relationships between the predictor features and the target feature, encapsulating how the neural network processes input data to generate predictions. The system may then generate a set of parameters for determining the target feature, where these parameters are derived from the extracted weights. For example, the parameters may include thresholds or activation values that are used to evaluate incoming messages and classify them as either exhibiting or not exhibiting the target feature (e.g., malicious activity).

As each new message is received, the system may generate, in real time or near real time, a set of outputs for the target feature based on the set of parameters derived from the neural network's weights. The system may extract relevant features from each message and process them through the neural network, applying the learned parameters to produce an output indicating whether or not the message is malicious. This output may indicate whether the message exhibits the target feature, such as being malicious or benign, and may be used to inform subsequent actions, such as accepting or blocking the message.

Over a certain time period, the system may determine, based on the set of outputs, a set of predictor features that contribute to a primary value of a primary external metric exceeding a primary threshold. For example, if the system observes that the rate of undetected malicious messages surpasses an acceptable limit, the system may analyze the outputs to identify which predictor features are most closely associated with this increase. This analysis may help the system determine which aspects of the input data are contributing to reduced accuracy and may prompt further action to address the issue.

In response to identifying that the primary external metric has exceeded the threshold, the system may generate and train a new neural network using the set of predictor features identified as contributing to the issue, along with the training dataset. This new neural network may be designed to place greater emphasis on the problematic features, potentially improving the system's ability to detect the target feature and reduce the rate of undetected malicious messages. The system may then extract a new plurality of weights from the newly trained neural network, corresponding to the set of predictor features.

Using the new neural network, the system may generate a new set of parameters for generating a new set of outputs for the target feature. These parameters, derived from the new plurality of weights, may reflect updated relationships between the set of predictor features and the target feature, potentially leading to improved detection performance. As each new message is received, the system may use the new set of parameters to generate outputs in real time or near real time, thereby continuously adapting to changing conditions and maintaining effective detection of the target feature.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates an exemplary machine learning model, in accordance with one or more implementations of this disclosure.

FIG. 4 illustrates a dataset for generating parameters for detecting malicious activity, in accordance with one or more implementations of this disclosure.

Figure 1:
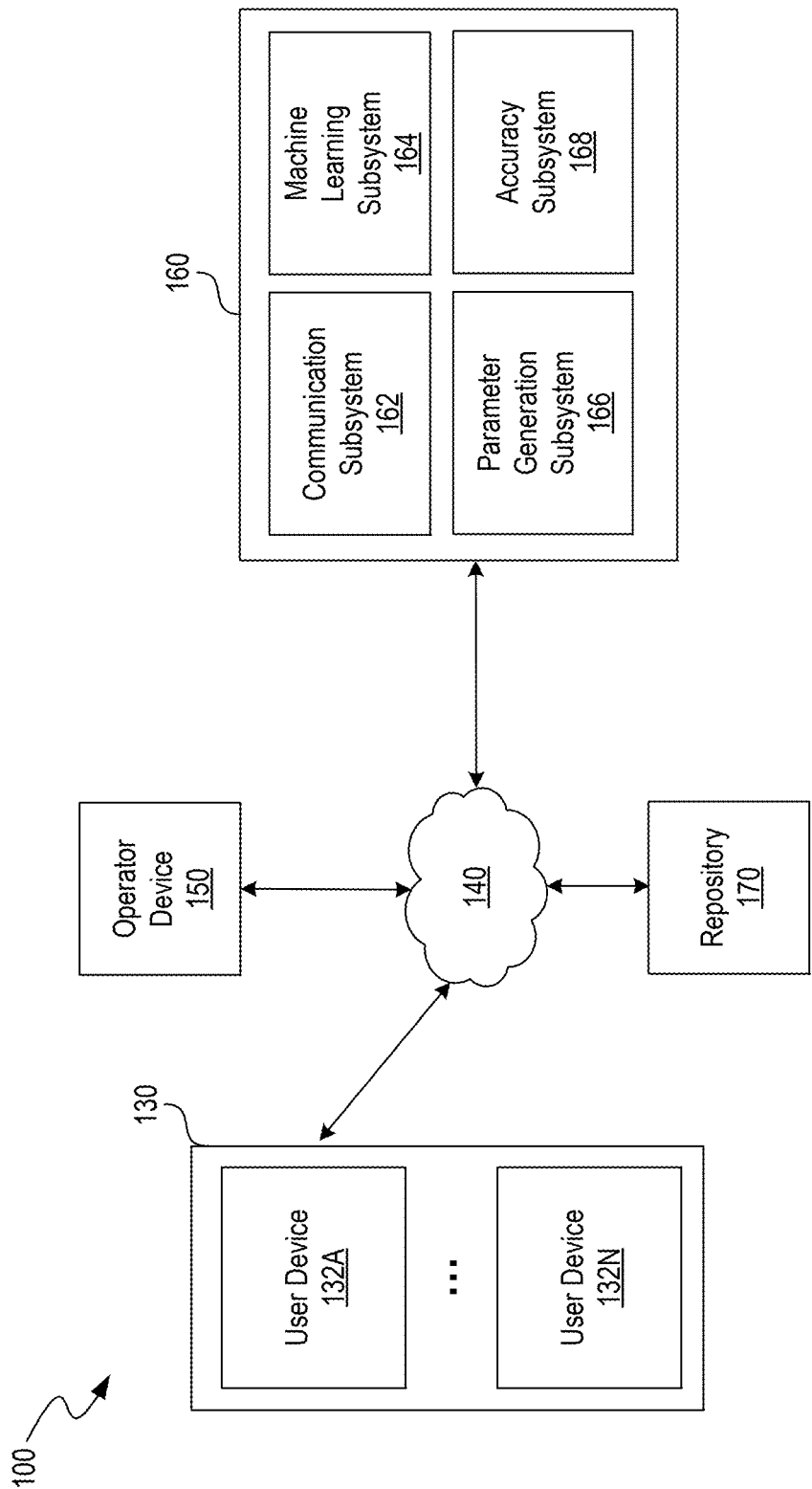
FIG. 1 shows an illustrative system for generating parameters for detecting malicious activity, in accordance with one or more implementations of this disclosure.

The technologies described herein will become more apparent to those skilled in the art from studying the Detailed Description in conjunction with the drawings. Implementations or implementations describing aspects of the invention are illustrated by way of example, and the same references may indicate similar elements. While the drawings depict various implementations for the purpose of illustration, those skilled in the art will recognize that alternative implementations may be employed without departing from the principles of the present technologies. Accordingly, while specific implementations are shown in the drawings, the technology is amenable to various modifications.

DETAILED DESCRIPTION

FIG. 1 shows an illustrative system 100 for generating parameters for detecting malicious activity, in accordance with one or more implementations of this disclosure. For example, the system 100 may be used to generate decision trees for determining a target feature based on predictor features and deriving parameters from the decision tree. For example, the system 100 may include a parameter generation system 160 able to perform parameter generation operations. The parameter generation system 160 may include software, hardware, or a combination of the two. For example, the parameter generation system 160 may be a physical server or a virtual server that is running on a physical computer system. In some implementations, the parameter generation system 160 may be configured on a user device (e.g., a laptop computer, a smartphone, a desktop computer, an electronic tablet, or another suitable user device) and configured to execute instructions for generating parameters using decision trees or other models. In particular, the parameter generation system 160 may include several subsystems, each configured to perform one or more steps of the methods described herein, such as a communication subsystem 162, a machine learning subsystem 164, a parameter generation subsystem 166, and an accuracy subsystem 168.

As described herein, the parameter generation system 160 may obtain data to generate decision trees for parameter generation. The parameter generation system 160 may retrieve data or sources of data from databases or data stores. As described herein, a parameter generation system may be any system (e.g., computer, device, node, etc.) that is enabled to execute one or more tools for generating parameters or enabled to execute tasks for which data may be passively collected. The parameter generation system 160 can receive the data from user devices 130 (e.g., user device 132A, user device 132N). The parameter generation system 160 may be configured to receive the data via a communication network 140 at the communication subsystem 162. The communication network 140 may be a local area network (LAN), a wide area network (WAN—e.g., the internet), or a combination of the two. The communication subsystem 162 may include software components, hardware components, or a combination of both. For example, the communication subsystem 162 may include a network card (e.g., a wireless network card or a wired network card) that is associated with software to drive the card. The communication subsystem 162 may pass at least a portion of the data, or a pointer to the data in memory, to other subsystems, such as the machine learning subsystem 164, the parameter generation subsystem 166, and the accuracy subsystem 168.

According to some implementations, the parameter generation system 160 may obtain such data by generating one or more commands to execute parameter generation operations. In some examples, the command(s) may specify a specific timeframe for obtaining the data (e.g., explicitly by identifying the timeframe via a start and an end time or implicitly by requesting data from a current block of time). Additionally, the system 100 may include a repository 170, which may store historical data, stored data, machine learning model parameters, and system commands. In some implementations, the repository 170 may store preconfigured commands related to generating parameters using decision trees or other models, which may be used by the parameter generation system 160 to manage parameter generation dynamically. The repository 170 may also include metadata or tags associated with stored data, such as identifiers, policies, or patterns. The parameter generation system 160 may retrieve data from the repository 170 to refine its predictions, optimize outcomes, and improve the accuracy of parameter generation. Additionally, the repository 170 may store augmented datasets used to update the machine learning model based on newly collected data, ensuring adaptive and evolving predictions.

The system 100 may further include an operator device 150. The operator device 150 may be a desktop computer, mobile device, or other suitable user interface (UI) through which an operator may review system notifications and monitor outcomes, such as flagged or blocked outputs. The parameter generation system 160 may transmit natural language explanations to the operator device 150 to provide insight into generated parameters and other outputs.

FIG. 2 illustrates an exemplary machine learning model 202, in accordance with one or more implementations of this disclosure. The machine learning model 202 may be an AI model, such as a generative model, or another model. According to some examples, the machine learning model may be any model, such as a model for classification. In some implementations, the machine learning model 202 may be trained to intake input 204, including input data and requests received. As a result of inputting the input 204 into the machine learning model 202, the machine learning model 202 may then output an output 206. As described herein, the input data may include data such as requests or prompts. In particular, the machine learning model 202 may receive a user prompt indicating a request for a report summarizing data over a time period.

For example, the output 206 may include a plurality of text-based analytics and a plurality of visual analytics based on the user prompt. Furthermore, as described, the machine learning model 202 may be configured to output a confidence interval or other metric for certainty regarding the outputs. The machine learning model 202 may be trained on a training dataset containing a plurality of user prompts and labels, such as a degree and indication for security conditions that were identified by operators. For example, the machine learning model 202 is described in relation to FIG. 2 herein.

The output parameters may be fed back to the machine learning model 202 as input to train the machine learning model 202 (e.g., alone or in conjunction with user indications of the accuracy of outputs, labels associated with the inputs, or other reference feedback information). The machine learning model 202 may update its configurations (e.g., weights, biases, or other parameters) based on the assessment of its prediction and reference feedback information (e.g., user indication of accuracy, reference labels, or other information). Connection weights may be adjusted, for example, if the machine learning model 202 is a neural network to reconcile differences between the neural network's prediction and the reference feedback regarding conditions.

One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions.

In some implementations, the machine learning model 202 may include an artificial neural network. In such implementations, the machine learning model 202 may include an input layer and one or more hidden layers. Each neural unit of the machine learning model 202 may be connected to one or more other neural units of the machine learning model 202. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 202 may be self-learning or trained rather than explicitly programmed and may perform significantly better in certain areas of problem-solving as compared to computer programs that do not use machine learning. During training, an output layer of the machine learning model 202 may correspond to a classification of the machine learning model 202, and an input known to correspond to that classification may be input into an input layer of the machine learning model 202 during training. During testing, an input without a known classification may be input into the input layer, and a determined classification may be output.

The machine learning model 202 may include embedding layers in which each feature of a vector is converted into a dense vector representation. These dense vector representations for each feature may be pooled at one or more subsequent layers to convert the set of embedding vectors into a single vector. The machine learning model 202 may be structured as a factorization machine model. The machine learning model 202 may be a nonlinear model or supervised learning model that may perform classification or regression. For example, the machine learning model 202 may be a general-purpose supervised learning algorithm that the parameter generation system 160 uses for both classification and regression tasks. Alternatively, the machine learning model 202 may include a Bayesian model configured to perform variational inference on the graph or vector.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding machine learning model input (e.g., in the case of an autoencoder) or may be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model is typically to minimize a loss function or maximize a reward function.

The training data may be a subset of a larger dataset. For example, a dataset may be split into three mutually exclusive subsets: a training set, a validation (or cross-validation) set, and a testing set. The three subsets of data may be used sequentially during machine learning model training. For example, the training set may be first used to train one or more machine learning models—e.g., each machine learning model having a particular architecture, having a particular training procedure, being describable by a set of model hyperparameters, or otherwise being varied from the other of the one or more machine learning models. The validation (or cross-validation) set may then be used as input data into the trained machine learning models to, e.g., measure the performance of the trained machine learning models or compare performance between them. Where hyperparameters are used, a new set of hyperparameters may be determined based on the measured performance of one or more of the trained machine learning models, and the first step of training (e.g., with the training set) may begin again on a different machine learning model described by the new set of determined hyperparameters. In this way, these steps may be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) may begin. The output generated from the testing set may be compared with the corresponding desired target values to give a final assessment of the trained machine learning model's accuracy. Other segmentations of the larger dataset or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model may be used. The process of updating (or learning) the parameters over many iterations is referred to as training. Training may be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters may then be fixed, and the machine learning model may be deployed to generate output in real-world applications (also referred to as "inference").

In some examples, a trained machine learning model may be fine-tuned, meaning that the values of the learned parameters may be adjusted slightly in order for the machine learning model to better model a specific task. Fine-tuning of a machine learning model typically involves further training the machine learning model on a number of data samples (which may be smaller in number/cardinality than those used to train the model initially) that closely target the specific task. For example, a machine learning model for generating natural language, e.g., for alerts to operators, or commands that have been trained generically on publicly available text corpora may be, e.g., fine-tuned by further training using specific training samples. The specific training samples may be used to generate language in a certain style or in a certain format. For example, the machine learning model may be trained to generate a blog post having a particular style and structure with a given topic.

In some embodiments, the parameter generation system may employ decision trees or other models (e.g., such as those discussed in relation to FIG. 2) to generate detection rules based on relevant predictor features for identifying malicious activity. In particular, the parameter generation system may select an initial decision tree and derive a set of rules (e.g., parameters) from it, which are then applied to incoming messages. If external metrics indicate that the current rules are not sufficiently restrictive (e.g., there is a rise in undetected malicious activity), the parameter generation system may generate a new, more restrictive decision tree and derive new parameters therefrom to enhance detection. If the new rules result in an excessive number of false positives, as indicated by user complaints or support system metrics, the parameter generation system may update the decision tree to relax the rules and reduce unnecessary disruptions. This iterative process allows the parameter generation system to dynamically calibrate its detection parameters, ensuring that the rules remain both effective and responsive to changing conditions.

The parameter generation system may generate a plurality of decision trees using a plurality of predictor features and a target feature. In some embodiments, a decision tree may refer to a type of predictive model that uses a tree-like structure to make decisions or classifications. Each internal node of a decision tree may represent a test or split based on a specific feature, each branch may represent the outcome of that test, and each leaf node may represent a final decision or classification. For example, a decision tree may first split messages based on whether the sender and recipient devices were located within 50 miles of each other, then further split based on the content of the message, and so on. The parameter generation system may finally classify the message as malicious or benign at the leaf node. Decision trees may provide interpretability, as the sequence of splits may be easily visualized and understood.

Figure 3A:
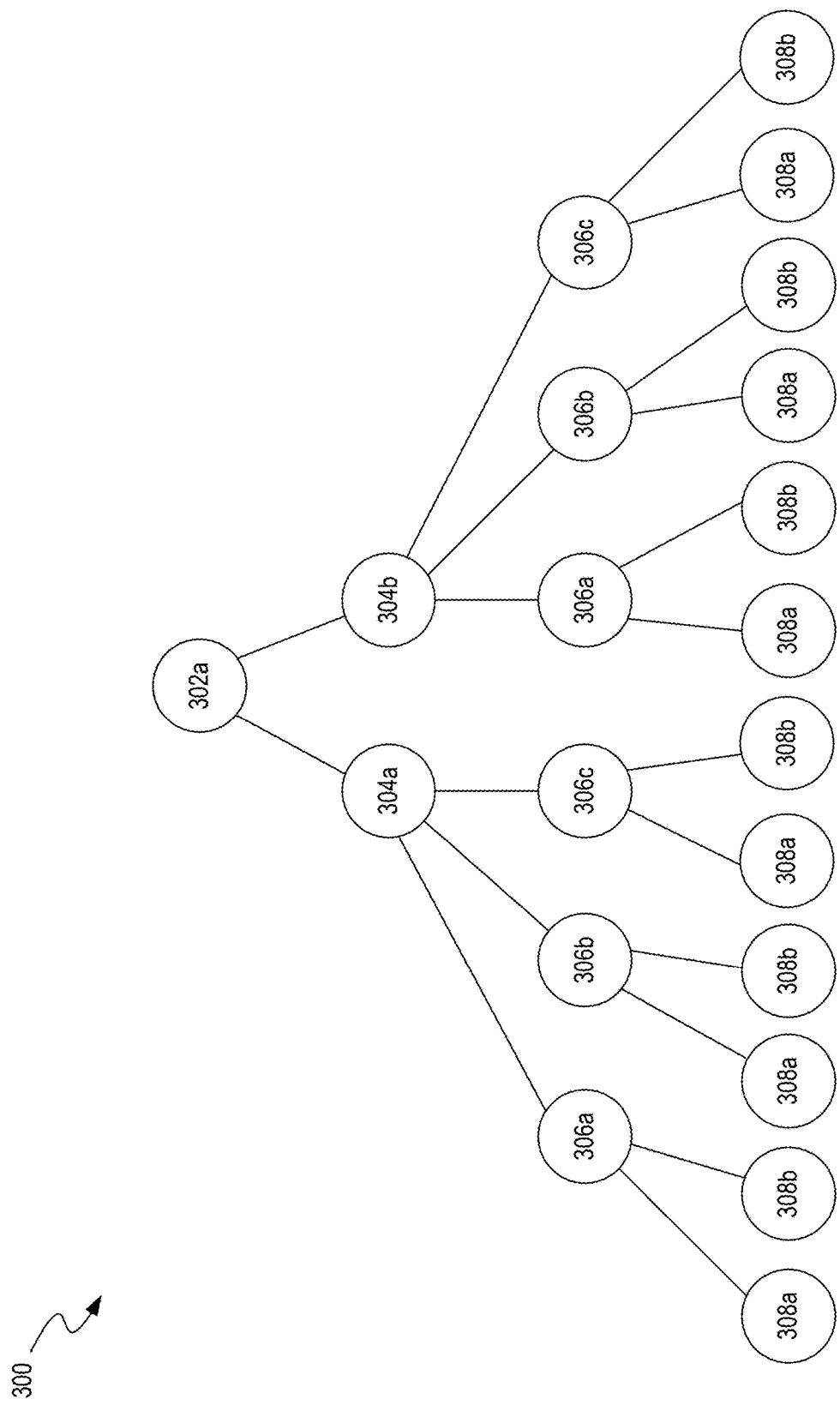
FIGS. 3A and 3B illustrate exemplary decision trees, in accordance with one or more implementations of this disclosure.

FIG. 3A illustrates an exemplary decision tree 300, in accordance with one or more implementations of this disclosure. As shown in FIG. 3A, the exemplary decision tree 300 may include a hierarchical structure beginning at a node 302a (e.g., root node). The initial split may be performed according to geographic proximity (e.g., feature 304), with two branches separating messages for which the proximity between sending and receiving devices is greater than or less than 50 miles (e.g., node 304a and node 304b). The next layer introduces a split based on message content category (e.g., feature 306), creating nodes for content types such as account, authentication, and customer support, represented by nodes 306a-c. Another layer introduces a split based on message frequency (e.g., feature 308), creating two nodes along each branch, represented by node 308a and node 308b, which separate messages for which the sending device has a daily messaging frequency that is greater or less than 100/day.

In some embodiments, a decision tree includes a final layer with nodes representing a possible output (e.g., terminal node or leaf node) for the decision tree. Each of these terminal or leaf nodes may be associated with a value, such as "malicious" or "not malicious." The value of each of the nodes may be based upon the path connecting the root node to that particular leaf node. Furthermore, the value of each of the nodes indicates a prediction for any messages corresponding to that particular path. For example, after following the series of splits for proximity, content category, frequency, and recipients, a first message may arrive at a first leaf node, which may output a "malicious" decision, while a second message may arrive at a second leaf node, which may output "not malicious."

The exemplary decision tree 300 demonstrates that each path through the decision tree-defined by feature values at each level-results in a leaf node, which delivers the prediction or probability score for the input message. These final layer outputs may collectively constitute the "set of outputs" for the corresponding decision tree, providing the likelihood or certainty of malicious activity for each scenario. In some embodiments, the exemplary decision tree 300 shows only a specific subset of a larger potential decision tree, as the parameter generation system may construct more extensive trees with additional branches and features when required.

Predictor features (e.g., feature 304, feature 306, feature 308) may be individual measurable properties or characteristics extracted from the data that are used to inform the decision-making process within the decision tree. Examples of predictor features may include the frequency of messages sent by a user (e.g., how many messages are sent per day), the presence of specific keywords or phrases, the reputation score of the sender (e.g., based on past behavior or external reputation databases), the time of day the message is sent, the geographic proximity of the sending and receiving devices, the number of recipients of messages from a device, the similarity of the message content to known malicious templates, or other features. By using a variety of predictor features, the parameter generation system may capture different aspects of potentially malicious behavior. The target feature may be the specific outcome or label that the parameter generation system is trying to predict or classify. In the context of malicious message detection, the target feature may be a binary label such as "malicious" or "not malicious." For example, after evaluating all relevant predictor features, the decision tree may output a classification indicating whether the message is likely to be a threat. In other applications, the target feature could be a probability score, a risk level, or another relevant output.

Each decision tree in the plurality of decision trees may be generated to predict the target feature using a unique order of a subset of the predictor features. For example, one decision tree may first evaluate the frequency of messages, then check for geographic proximity, and finally consider sender reputation, while another tree may start with sender reputation, followed by message content analysis. By exploring different sequences and combinations, the parameter generation system may identify which order of feature evaluation leads to the most accurate and reliable detection of malicious messages.

As an illustrative example, the parameter generation system may include 13 available predictor features, and it may be tasked with generating decision trees that each use a subset of 10 of these features. The number of unique ways to choose 10 features from 13 is given by the mathematical combination "13 choose 10," or 286. For example, the parameter generation system may generate 286 different combinations of 10 features (e.g., 286 different decision trees such as the exemplary decision tree 300, shown in FIG. 3A). Furthermore, for each combination, the parameter generation system may consider every possible unique order in which those 10 features may be arranged within a decision tree. For example, one decision tree may use the features A, B, C, D, E, F, G, H, I, and J in a specific order, while another may use the same set of features but in a different order, such as J, I, H, G, F, E, D, C, B, and A.

This approach may force some decision trees to omit one or more of the most powerful or predictive variables. This may ensure that the decision trees do not become overly reliant on a small set of highly predictive features-deliberately testing alternative combinations to uncover hidden patterns or vulnerabilities. The parameter generation system may force the most predictive variables to appear in the first few splits of some trees, reflecting their high predictive power, while in other trees, these variables may be omitted entirely to encourage the respective decision tree to leverage less obvious features. This process may result in a diverse set of decision trees, some of which may capture malicious activity that would otherwise be missed if only the most predictive features were used.

Figure 3B:
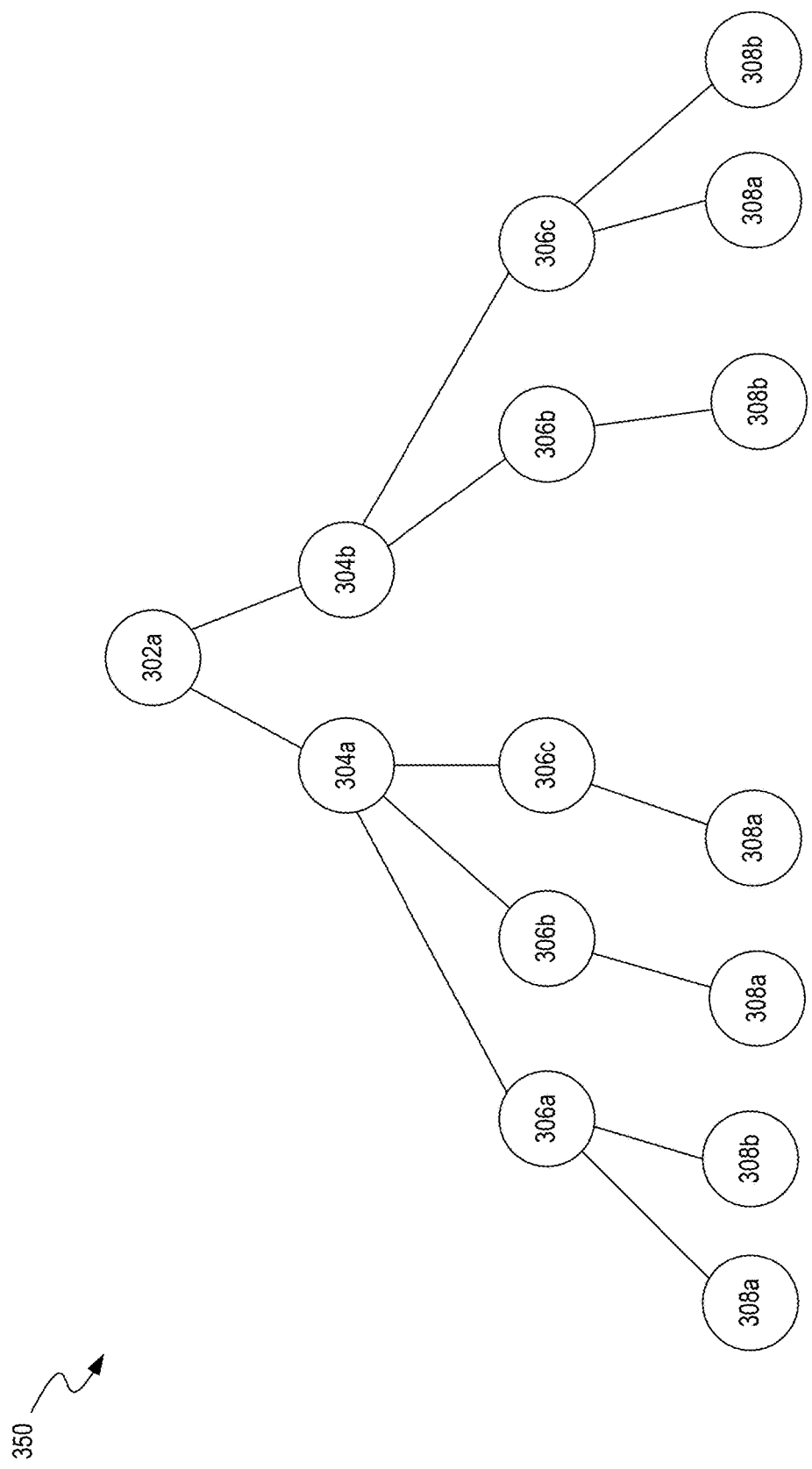

FIG. 3B may illustrate an exemplary decision tree 350, in accordance with one or more implementations of this disclosure. In some embodiments, the exemplary decision tree 350 may be a pruned version of the exemplary decision tree 300 shown in FIG. 3A, where certain branches or nodes may have been removed to simplify the model and improve its generalizability. Pruning decision trees may involve eliminating nodes that contribute little to the predictive accuracy of the tree, which may help prevent overfitting to the training data. For example, if a particular split in the tree only applies to a very small subset of messages and does not significantly improve the classification of "malicious" versus "not malicious," that branch may be pruned away. This process may be especially appropriate when the decision tree becomes overly complex, as a pruned tree may maintain high accuracy on new, unseen data while reducing computational complexity and improving interpretability. In some embodiments, pruning may be applied after the initial tree is constructed, using validation data to determine which branches may be safely removed without sacrificing performance. For example, if a branch based on message frequency for devices sending over 100 messages per day only marginally improves predictions for a rare scenario, it may be pruned to yield a more robust and efficient decision tree.

In addition to pruning branches that contribute little to predictive accuracy, decision trees may also be pruned based on the logical impossibility of certain feature combinations. During the construction or evaluation of a decision tree, it may become apparent that some paths represent scenarios that cannot occur in practice due to inherent constraints in the data or domain knowledge. For example, if a branch splits on a feature indicating that a message is sent from a device located more than 50 miles away and a subsequent split attempts to evaluate a feature that only applies to local devices, this combination may be logically impossible. In such cases, these branches may be pruned from the tree, as they do not correspond to any real-world data and may only add unnecessary complexity. Pruning based on logical impossibility may help ensure that the decision tree remains both interpretable and relevant, focusing only on feasible scenarios and further reducing the risk of overfitting or misclassification.

FIG. 4 illustrates a dataset 400 for generating parameters for detecting malicious activity, in accordance with one or more implementations of this disclosure. The dataset 400 may include message identifiers 402, such as message 414, message 416, and message 418. These identifiers may serve to uniquely identify each message being evaluated by the parameter generation system. For example, message 414 may refer to a single message sent within a monitored environment, and this identifier may allow the system to track its classification outcomes or review its detailed predictor feature values later.

Feature 404 may capture a quantitative property of each message, such as a count, score, or distance metric. For example, feature 404 may represent the proximity between sending and receiving devices, with values such as 10, 101, and 14 for the various messages. In some embodiments, feature 404 may correspond to feature 304, as shown in FIGS. 3A and 3B. As an example, a message with feature 404 having a value of 101 may indicate the sender and recipient are located over 100 miles apart, which may be more suspicious in certain cases than lower values.

Feature 406 may denote a categorical or string-based attribute tied to the content or purpose of the message, such as "account" or "authentication." This feature may help the parameter generation system distinguish between general account-related inquiries and more sensitive requests, such as authentication requests. For example, a message labeled as "authentication" may be processed with additional scrutiny during login workflows due to its higher sensitivity. In some embodiments, this feature corresponds to feature 306, as shown in FIGS. 3A and 3B.

Feature 408 may reflect the frequency at which a certain event is observed, using values such as "25/day," "150/day," or "39/day." This feature, which may correspond to feature 306 in FIGS. 3A and 3B, may quantify how many times a user or device sends messages per day. For example, if the parameter generation system observes "150/day," this high frequency may prompt stricter evaluation for possible malicious automation or spamming. Feature 408 may satisfy another quantitative criterion, such as representing the number of recipients of a particular message or the volume of outbound communications. With values like 8, 150, or 31, feature 408 may help the parameter generation system decide whether the number of message targets raises red flags. In some embodiments, feature 408 corresponds to feature 308 from FIGS. 3A and 3B. For example, a message sent to 150 recipients in one day may indicate a potential spam event, while 8 recipients may fall within normal usage patterns.

The parameter generation system may select, based on accuracy metrics associated with each decision tree of the plurality of decision trees, a preferred decision tree from among the plurality of decision trees generated by the system. This selection process may involve evaluating the performance of each decision tree on a testing dataset, where each tree generates a set of outputs—such as predictions for whether messages are malicious or benign. The system may compare the accuracy metrics, such as precision, recall, or overall classification accuracy, for each decision tree's outputs. The preferred decision tree may be the one that generates sets of outputs for the testing dataset with higher corresponding accuracy metrics than those produced by other decision trees in the plurality. For example, if one decision tree consistently achieves a higher true positive rate and a lower false positive rate on the testing dataset, the system may select this tree as the preferred model for subsequent use.

In some embodiments, the parameter generation system may identify a segment of the testing dataset based on one or more criteria, such as message type, sender profile, or time period. The system may then evaluate the performance of each decision tree specifically on this segment. The preferred decision tree may be the one that, when applied to this segment, generates sets of outputs with higher corresponding accuracy metrics than the other decision trees. For example, if a particular decision tree performs exceptionally well on messages related to authentication requests, the system may select it as the preferred model for that segment, ensuring that the detection rules are optimally tailored to the most relevant or high-risk portions of the data.

In some embodiments, the parameter generation system generates, using the preferred decision tree, a set of parameters that is used to determine the target feature. The process of parameter generation may begin by analyzing the structure of the preferred decision tree itself. Each node in the decision tree may represent a decision point based on a specific predictor feature, such as message frequency, sender reputation, or the presence of certain keywords in the message content. The branches of the tree correspond to different possible values or ranges for these features, and the leaves of the tree represent the final classification or prediction outcome. To generate parameters, the system may traverse the decision tree and extract the conditions that define the path from the root to each leaf. These conditions are then translated into a set of rules or thresholds that may be applied to new messages. For example, if a path through the tree involves checking whether the sender's reputation score is below a certain threshold and whether the message contains a suspicious keyword, these checks become part of the parameter set. The system may repeat this process for every path in the tree, resulting in a comprehensive set of parameters that collectively define how the model will classify incoming messages.

For example, the decision tree may include a node that evaluates the frequency of messages sent by a particular user. If the frequency exceeds 50 messages per hour, the tree may branch to a node that checks for the presence of specific keywords such as "urgent" or "password." If both conditions are met, the leaf node may classify the message as malicious.

In this scenario, the generated parameters include a frequency threshold of 50 messages per hour and a list of suspicious keywords. The system may then use these parameters to evaluate new messages: if a message is sent by a user who has already sent more than 50 messages in the past hour and the message contains one of the flagged keywords, the system determines that the message is malicious. The system may take certain corrective actions, such as blocking the message.

In some embodiments, the decision tree may incorporate additional features, such as the time of day the message is sent or the historical behavior of the sender. For example, a branch of the tree may specify that if a message is sent outside of normal business hours and the sender has a low reputation score, the message is deemed malicious. The parameters generated from this branch include a time window (e.g., outside 8:00 AM to 6:00 PM) and a minimum reputation score threshold. The parameter generation system may thus create nuanced rules that reflect the complex, context-dependent nature of malicious activity.

After generating individual parameters from each path in the decision tree, the parameter generation system may further refine and optimize these parameters by combining overlapping or redundant conditions into a more concise rule set. This process may involve analyzing the extracted rules to identify common patterns or shared thresholds that appear across multiple branches. For example, if several rules independently flag messages as malicious based on similar frequency thresholds or overlapping time windows, these rules may be merged into a single, broader rule that captures the essential criteria without unnecessary repetition. As an illustrative example, the decision tree may produce two separate rules: one that classifies a message as malicious if it is sent outside of business hours and more than 50 miles from the sender's home and another that classifies a message as malicious if it is sent outside of business hours and more than 100 miles from the sender's home. These two rules may be combined into a single rule stating that any message sent outside of business hours by a device more than 50 miles from the sender's home is malicious. Additionally, the system may use logical simplification techniques to consolidate rules that lead to the same outcome, thereby reducing the overall number of rules and streamlining the evaluation process. By combining rules in this manner, the parameter generation system may create a more efficient and manageable set of parameters, which may improve both the interpretability and performance of the parameters when applied to new data. This approach may also help ensure that the rule set remains scalable and adaptable as new features or patterns are discovered.

Once the set of parameters is generated, the system may apply them in real time or near real time to incoming messages. As each message arrives, the system extracts the relevant features and evaluates them against the set of parameters derived from the decision tree. If the message meets all the conditions specified by a particular path in the tree, the system may classify the message according to the outcome at the corresponding leaf node. This approach allows for efficient and consistent prediction of the target feature across a large volume of messages. Furthermore, the parameter generation system may adapt these parameters over time as new data becomes available or as the tactics of malicious actors evolve. If the accuracy metrics indicate that the current parameters are no longer effective, the system may retrain the decision tree using updated data and generate a new set of parameters. This iterative process ensures that the detection rules remain both accurate and responsive to changing conditions.

In some embodiments, the plurality of messages corresponds to a first plurality of entries within a testing dataset. In this context, each output from the set of outputs may represent a prediction for the target feature-such as whether a message is malicious or benign-for a specific entry in this testing dataset. For example, as the system processes the testing dataset, it may apply the parameters generated from the preferred decision tree to each entry, extracting relevant features and evaluating them according to the established rules. For example, if the testing dataset contains 1,000 message entries, the system may generate 1,000 corresponding outputs, with each output indicating the classification for the associated message. These outputs may take the form of binary labels (e.g., "malicious" or "benign"), probability scores, or other relevant indicators, depending on how the decision tree is structured and how the parameters are defined.

Returning to FIG. 4, a target feature 410 may represent the parameter generation system's determination for each message. This target feature may correspond to the feature 308 in FIGS. 3A and 3B. This value may represent the system's determination of whether the message is "malicious" or "not malicious." Based on applying the generated parameters to the aforementioned features, the parameter generation system may classify message 416 as "malicious" due to the combination of high recipient count and frequency while classifying message 414 and message 418 as "not malicious" if their attributes align with known benign behaviors.

After a period of time, the system may determine that a primary value of a primary external metric has exceeded a primary threshold. In this context, the primary value may serve as an indicator of the overall performance or accuracy of the set of outputs generated by the system. The primary value may be indicative of the set of outputs having an accuracy level that does not meet an accuracy threshold. For example, the primary external metric might represent the number or rate of undetected malicious messages within the system over a given time frame. The primary external metric may be any measure that indicates an effectiveness of the parameters generated using the decision tree. If this value surpasses the predefined primary threshold, it may signal that the current detection parameters are not sufficiently effective and that the accuracy level of the outputs does not meet the required accuracy threshold. This determination may prompt the system to recognize that its current rules or parameters may be underperforming-either by failing to detect enough malicious activity or by allowing too many false negatives. As a result, the system may initiate corrective actions, such as retraining the decision tree, adjusting predictor feature thresholds, or generating new parameters, in order to improve the accuracy and reliability of future outputs.

As shown in FIG. 4, a target feature label 412 may have a value associated with each message within the dataset 400. For example, after generating outputs (e.g., the target feature 410) for each entry in the dataset 400, the parameter generation system may compare these outputs to the known ground truth labels associated with each message (e.g., the target feature label 412). This comparison may enable the calculation of key performance metrics, such as accuracy, precision, recall, and the rate of false positives and false negatives. As an example, a rate of false negatives may correspond to the primary external metric assessed by the parameter generation system. By systematically evaluating how well the predicted classifications align with the actual labels, the system may assess the effectiveness of the parameters derived from the preferred decision tree. If the results indicate that the model is performing well—accurately distinguishing between malicious and benign messages—the parameters may be validated for use in a production environment. Conversely, if the evaluation reveals significant discrepancies or a high rate of misclassifications, the parameter generation system may initiate further refinement, such as retraining the decision tree or adjusting the feature thresholds, to improve predictive performance.

As shown in FIG. 4, the target feature 410 may be accurate for message 414 and message 416. This means that the parameters, when applied to message 414 and message 416, correctly determined that these messages were "not malicious" and "malicious," respectively. However, for message 418, the target feature 410 is "not malicious," while the target feature label 412 is "malicious." This may indicate that the parameters, when applied to message 418, incorrectly classified message 418 as not malicious. In reality, message 418 was malicious and the parameters generated based on the preferred decision tree failed to capture the malicious nature of the message. Message 418 may thus represent a false negative. A rate of false negatives may represent a value of the primary external metric. Based on the value of the primary external metric exceeding a relevant threshold, the parameter generation system may regenerate or modify the parameters.

The parameter generation system then determines a set of predictor features relating to the primary external metric. This process may involve analyzing the set of outputs and determining which features of the messages—such as sender behavior, message content, message frequency, or timing—are most closely associated with changes in the primary external metric, such as the rate of undetected malicious messages. For example, the parameter generation system may perform statistical analyses or employ feature importance techniques to evaluate the correlation between each predictor feature and the observed fluctuations in the external metric. For example, the system may use regression analysis, decision tree feature importance scores, or other data mining methods to identify which features have the strongest influence on false negatives in the set of outputs, which in turn influences the rate of undetected malicious messages. Once these influential features are identified, the system may prioritize them for further model refinement. The system may then use these selected predictor features as the basis for constructing new decision trees or updating existing ones. By focusing on the features that are most relevant to the primary external metric, the parameter generation system may ensure that subsequent detection rules are more responsive to the underlying causes of performance degradation.

For example, if the system observes that undetected malicious messages are more common when messages are sent in high volume during off-peak hours, it may identify message frequency and time of day as key predictor features. The system may then focus on these features when constructing or updating the decision tree, ensuring that the new parameters are sensitive to these risk factors. In this scenario, a new decision tree may be structured so that the initial nodes evaluate whether a message is sent during off-peak hours and whether the sender's message frequency exceeds a certain threshold. If both conditions are met, the tree may assign a higher probability that the message is malicious, prompting the system to flag or block the message for further review. Additionally, the parameter generation system may continuously monitor the effectiveness of these parameters by tracking the rate of undetected malicious messages after the new rules are implemented. If the targeted approach results in a measurable decrease in undetected threats, the system may retain these predictor features in future iterations. Conversely, if malicious actors adapt their tactics and the rate of undetected messages begins to rise again, the parameter generation system may re-evaluate the importance of message frequency and time of day and consider incorporating additional features—such as sender reputation or message content analysis—into the decision tree.

In particular, the parameter generation system may determine a new decision tree that includes the set of predictor features. For example, the parameter generation system may determine a new decision tree that includes the set of predictor features that was previously identified as being most relevant to the primary external metric. In some embodiments, the parameter generation system may determine a new decision tree by first comparing the set of predictor features identified as relevant to the primary external metric with the predictor features used in each decision tree of the initial plurality of decision trees already generated. This comparison may not only consider whether the same features are present but also the specific order in which these features are evaluated within each decision tree. The order of features may be significant because it may affect how the decision tree splits the data and, consequently, the overall performance of the model. For example, if the set of predictor features identified includes message frequency, time of day, and sender reputation, the system may search through the plurality of existing decision trees to find one that uses these exact features in the same sequence. If an existing decision tree evaluates message frequency first, then time of day, and finally sender reputation—matching both the features and their order as determined by the system—this tree may be selected as the new decision tree. If the system determines that an existing decision tree within the plurality includes the set of predictor features in the required order, it may designate this existing decision tree as the new decision tree. This approach may help the system avoid unnecessary re-computation and leverage previously constructed models that already align with the current feature selection and ordering requirements. By ensuring both feature and order matching, the parameter generation system may maintain consistency in its decision-making process and optimize the efficiency of its model selection workflow.

In some embodiments, if no existing decision tree matches both the set and the order of predictor features, the system may proceed to construct a new decision tree that satisfies these criteria. This process may begin by selecting the features—such as message frequency, time of day, sender reputation, or message content—that have demonstrated a strong correlation with the rate of undetected malicious messages or another key performance indicator. The system may then use these features as the foundation for constructing a new decision tree, ensuring that the model is specifically tailored to address the factors contributing to recent performance issues. When building the new decision tree, the parameter generation system may employ machine learning algorithms or statistical methods to analyze historical data and identify the optimal structure for the tree. For example, the system may use training data that includes both benign and malicious messages, along with their associated predictor feature values, to determine how best to split the data at each node of the tree. The goal may be to maximize the separation between malicious and benign messages, using the selected predictor features as decision points. The resulting decision tree may contain a series of decisions and thresholds that reflect the most effective way to distinguish between legitimate and suspicious activity based on the current threat landscape.

The parameter generation system may generate a new plurality of decision trees using the set of predictor features and the target feature. This may involve constructing multiple decision trees, each utilizing the same set of predictor features but potentially arranging them in different orders or applying different split criteria at each node. By exploring various combinations and orderings, the system may comprehensively evaluate how different decision paths impact the classification of messages as malicious or benign. For example, one decision tree may first evaluate message frequency, then time of day, and finally, sender reputation, while another tree may prioritize sender reputation before considering message frequency and time of day.

Once this new plurality of decision trees is generated, the parameter generation system may apply each tree to a testing dataset. For each decision tree, the system may generate a corresponding set of outputs, with each output representing a prediction for the target feature—such as whether a message is malicious—for a specific entry in the testing dataset. The system may then calculate accuracy metrics for each set of outputs, such as precision, recall, true positive rate, false positive rate, and overall classification accuracy. These metrics may provide a quantitative basis for comparing the performance of the different decision trees. The system may then select the new decision tree from the new plurality of decision trees based on which tree generates sets of outputs for the testing dataset that have higher corresponding accuracy metrics than those produced by the other decision trees. For example, if one decision tree achieves a higher true positive rate and a lower false positive rate than the others, the system may designate this tree as the preferred model for subsequent use. This selection process may ensure that the chosen decision tree is optimally tailored to the current data and threat landscape, maximizing the effectiveness of the detection rules.

The parameter generation system may determine the new decision tree such that it satisfies a primary requirement that a new set of outputs for the target feature from the new decision tree indicates that the primary value of the primary external metric is less than the primary threshold. For example, after constructing the new decision tree using the selected predictor features, the system may evaluate its effectiveness by applying it to a relevant dataset—such as a validation or testing set—and measuring the resulting value of the primary external metric. For example, if the primary external metric is the rate of undetected malicious messages, the system may apply the new decision tree to the dataset and calculate how many malicious messages go undetected under the new rules. If the new decision tree results in a primary value that is below the predefined threshold, the system may consider the tree to have met the primary requirement. This process may involve iteratively adjusting the structure of the decision tree, such as modifying feature splits or thresholds, until the desired performance is achieved. The system may use various evaluation techniques, such as cross-validation or holdout testing, to ensure that the new decision tree generalizes well to unseen data and does not simply overfit to the training set.

Figure 5A:
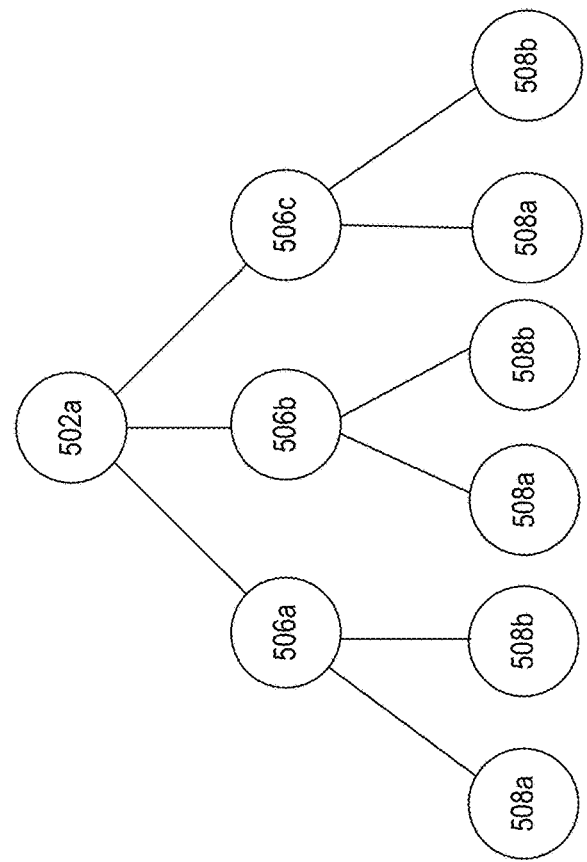
FIGS. 5A and 5B illustrate new exemplary decision trees, in accordance with one or more implementations of this disclosure.
Figure 5B:
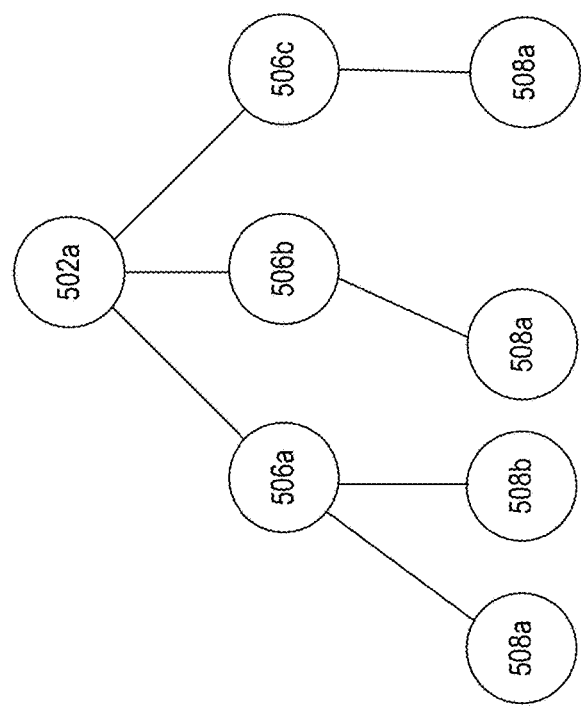

FIG. 5A illustrates a new exemplary decision tree 500, in accordance with one or more implementations of this disclosure. In some embodiments, the new exemplary decision tree 500 may represent a new decision tree generated using a set of parameters identified from the plurality of parameters used to generate the exemplary decision tree 300 as shown in FIG. 3A. The new exemplary decision tree 500 may include a subset of the features included in the exemplary decision tree 300. In some embodiments, the new exemplary decision tree 500 includes the features in a different order than the features in the exemplary decision tree 300. In some embodiments, the new exemplary decision tree 500 may include a root node (e.g., node 502a). The new exemplary decision tree 500 may next include nodes 506a-c for a feature 506 (e.g., corresponding to the feature 306 as shown in FIGS. 3A and 3B). The new exemplary decision tree 500 may next include nodes 508a-b for a feature 508 (e.g., corresponding to the feature 308 as shown in FIGS. 3A and 3B). In some embodiments, the new exemplary decision tree 500 does not include a feature corresponding to the feature 304, as shown in FIGS. 3A and 3B. FIG. 5B illustrates a new exemplary decision tree 550, in accordance with one or more implementations of this disclosure. In some embodiments, the new exemplary decision tree 550 represents a pruned version of the new exemplary decision tree 500, as shown in FIG. 5A. In some embodiments, the reasoning or techniques for pruning the decision tree may be any of the reasonings or techniques discussed in relation to FIGS. 3A and 3B.

As an illustrative example, the parameter generation system may determine, based on the exemplary decision tree 300, that the set of parameters most influential toward the primary external metric (e.g., undetected malicious messages) exceeding a threshold is the feature 306 and the feature 308. The parameter generation system may generate a new plurality of decision trees using this set of features using every possible ordering of the features. The parameter generation system may determine an ordering of the set of features from which generated rules most effectively cause the rate of undetected malicious activities to fall below a threshold. For example, the most effective ordering may be the feature 306 then the feature 308. This ordering of features may generate a set of outputs for the target feature that is most accurate. The parameter generation system may thus generate the new exemplary decision tree 500 to include the set of features in a particular order to generate a new set of outputs for the target feature that is most accurate. The new exemplary decision tree 500 may then be used to generate rules that most effectively cause the rate of undetected malicious activities to fall below a threshold.

In particular, the parameter generation system may generate, using the new decision tree, a new set of parameters for generating a new set of outputs for the target feature. The parameter generation system may begin by analyzing the structure of the new decision tree, which has been constructed or chosen based on its superior performance with respect to the relevant accuracy metrics. The system may traverse the decision tree to extract the specific decision points, thresholds, and feature splits that define how the tree classifies messages as malicious or benign. For example, the new decision tree may include nodes that evaluate whether the message frequency exceeds a certain threshold, whether the message is sent during off-peak hours, and whether the sender's reputation score falls below a specified value. Each of these decision points may be translated into a parameter—such as a numerical threshold or a categorical rule—that may be systematically applied to incoming messages. The collection of these parameters may form a comprehensive rule set that guides the system's classification process.

The parameter generation system may generate, in real time or near real time for a new plurality of messages as each message is received, the new set of outputs for the target feature based on the new set of parameters. For example, as each incoming message arrives, the parameter generation system may immediately extract relevant features—such as sender information, message content, frequency, and timing—and apply the new parameters derived from the new decision tree. For example, if the new set of parameters includes a threshold for message frequency, a rule for time of day, and a minimum sender reputation score, the system may evaluate each message against these criteria as soon as it is received. If a message is sent during off-peak hours from a sender with a low reputation and the sender has exceeded the allowed message frequency, the system may classify the message as malicious in real time. Conversely, if a message does not meet any of the risk thresholds, it may be classified as benign without delay. This real-time or near real-time processing capability may be essential for environments where rapid detection and response to malicious activity are critical. By generating outputs for the target feature as each message is received, the system may ensure that threats are identified and addressed promptly, minimizing the window of opportunity for malicious actors. Additionally, this approach may help maintain a seamless user experience, as legitimate messages may be processed and delivered without unnecessary delay.

Returning to FIG. 4, the new plurality of messages may correspond to a second plurality of entries of the testing dataset (e.g., dataset 400). For example, the dataset 400 may be a subset of a larger dataset that includes additional entries. Some of these additional entries may be used to test the new parameters generated using the new decision tree. In some embodiments, each output of the set of outputs may include a new prediction for the target feature for a new corresponding entry of the second plurality of entries. For example, if dataset 400 originally contained 1,000 message entries and the new plurality of messages consists of 500 entries not previously used in training or validation, the system may apply the new set of parameters to these 500 entries. As each new message is processed, the system may extract the relevant features—such as message frequency, time of day, and sender reputation—and use the new parameters to generate a prediction for each entry. If a particular message in the new subset is sent at an unusual hour from a sender with a low reputation and exceeds the frequency threshold, the system may classify it as malicious. Conversely, messages that do not meet these criteria may be classified as benign. This process may allow the system to evaluate the effectiveness of the new parameters in real-world conditions and ensure that the updated detection rules are robust and reliable when applied to new data.

Based on the new set of outputs satisfying the primary requirement, the parameter generation system may continue to process incoming messages to determine whether to accept or reject each message. For example, after validating that the new parameters—derived from the new decision tree—successfully reduce the primary value of the primary external metric below the primary threshold, the parameter generation system may deploy these parameters for ongoing, real-time message evaluation. For example, if the primary requirement is that the rate of undetected malicious messages must remain below a certain threshold and the new set of outputs demonstrates that this condition is met, the parameter generation system may use the new parameters as the basis for its operational decision-making. As each new message arrives, the parameter generation system may extract the relevant features and apply the new parameters to generate a determination for the target feature. If the determination is that the message is benign, the system may accept and deliver the message to its intended recipient. However, if the determination is that the message is malicious, the system may reject, quarantine, or flag the message for further review.

In some embodiments, the parameter generation system may make other modifications to the decision trees used to generate parameters. For example, the parameter generation system may determine that the new parameters are overly restrictive, resulting in an undesirable side effect, such as an increased number of legitimate messages being incorrectly flagged as malicious. This determination may be made by monitoring a different external metric, such as a dependent external metric, which may reflect the impact of the new parameters on user experience or operational efficiency. For example, the parameter generation system may track the volume of support requests or user complaints as a dependent external metric. If the parameter generation system observes that the dependent value of this metric—such as the number of support tickets related to blocked messages—exceeds a predefined dependent threshold, the system may determine that the new parameters are too strict. This dependent value may be associated with the new set of outputs for the target feature generated by the new decision tree, indicating that the recent changes in detection rules have led to an increase in false positives or unnecessary disruptions for legitimate users.

In some embodiments, the dependent external metric—such as support system traffic—is inversely related to the primary external metric, which may be the rate of undetected malicious messages. Thus, as the parameter generation system makes the detection rules less restrictive to reduce false positives and support traffic, there is a risk that the rate of undetected malicious messages may increase. Therefore, the parameter generation system may iteratively adjust the decision tree, carefully monitoring both metrics to ensure that the updated set of outputs satisfies the dependent requirement (i.e., the dependent value is less than the dependent threshold) without compromising the primary requirement for security.

In response to determining that the dependent value of the dependent external metric is too high, the parameter generation system may initiate further modifications to the decision tree or the parameters it generates. The parameter generation system may generate an updated decision tree by adjusting thresholds, relaxing certain rules, or re-evaluating the importance of specific predictor features to reduce the restrictiveness of the detection process. By doing so, the parameter generation system may aim to bring the dependent external metric back below the dependent threshold to achieve a more effective balance between malicious activity detection and a positive user experience. The parameter generation system may generate an updated decision tree by adjusting one or more values of one or more predictor features from the set of predictor features used in the new decision tree. For example, if the parameter generation system observes that a low threshold for message frequency in the new decision tree is causing many legitimate users who send frequent messages to be incorrectly flagged as malicious, it may decide to increase this threshold in the updated decision tree. By raising the message frequency threshold, the parameter generation system may reduce the number of false positives, which in turn may decrease the volume of support requests related to blocked messages. This adjustment may help ensure that only truly suspicious activity is flagged while legitimate high-frequency users are not unnecessarily disrupted.

In some embodiments, the parameter generation system may also adjust other predictor feature values, such as relaxing the criteria for sender reputation or modifying the list of suspicious keywords. For example, if the parameter generation system finds that messages containing certain keywords are being flagged too aggressively, it may refine the keyword list to focus only on those terms most strongly associated with malicious activity. By fine-tuning these predictor feature values, the parameter generation system may create an updated decision tree that better balances security and usability.

The updated decision tree generated by the parameter generation system may be specifically designed to satisfy the dependent requirement that an updated set of outputs from the updated decision tree is indicative of the dependent value being less than the dependent threshold. This means that after the parameter generation system adjusts one or more values of the predictor features—such as increasing the threshold for message frequency or relaxing the criteria for sender reputation—the system may apply the updated decision tree to a relevant dataset and monitor the resulting dependent external metric. For example, if the dependent external metric is the volume of support tickets related to false positives, the parameter generation system may use the updated decision tree to classify a new set of messages and then track how many legitimate messages are incorrectly flagged as malicious. If the number of support tickets generated as a result of these false positives falls below the dependent threshold, the parameter generation system may determine that the updated decision tree has successfully satisfied the dependent requirement. This outcome indicates that the adjustments made to the predictor feature values have effectively reduced the negative impact on user experience or operational efficiency. In some embodiments, the parameter generation system may continue to monitor both the dependent and primary external metrics to ensure that the updated decision tree maintains an appropriate balance between minimizing false positives and maintaining strong security. By iteratively refining the decision tree and validating its outputs against the dependent requirement, the parameter generation system may ensure that the detection rules are not only effective in identifying malicious activity but also considerate of the broader operational context.

The parameter generation system may generate, using the updated decision tree, an updated set of parameters for generating the updated set of outputs for the target feature. This process may begin by analyzing the structure of the updated decision tree, which has been refined to address issues identified through dependent external metrics, such as excessive false positives or increased support system traffic. The parameter generation system may extract the specific decision points, thresholds, and feature splits from the updated decision tree, translating them into a new set of operational parameters. For example, if the updated decision tree now includes a higher threshold for message frequency and a more selective list of suspicious keywords, the parameter generation system may encode these changes as updated parameters. These parameters may specify, for example, that only messages exceeding 200 per day from a single sender and containing certain high-risk keywords are to be flagged as malicious. By updating these thresholds and criteria, the parameter generation system may ensure that the rules are less restrictive, thereby reducing the number of legitimate messages incorrectly classified as malicious.

In some embodiments, the updated set of parameters generated by the parameter generation system may include one or more override parameters. These override rules may be designed to provide additional flexibility and context sensitivity to the detection process, allowing the parameter generation system to adapt its behavior under special circumstances or in response to external events. For example, the parameter generation system may introduce new parameters that override certain standard parameters when specific conditions are met, ensuring that the detection rules remain both effective and appropriate for the current environment. For example, during a natural disaster or other emergency situation, normal communication patterns may change significantly. The parameter generation system may recognize this context—either through external signals, such as alerts from emergency management systems, or through observed changes in message patterns—and may relax certain parameters accordingly.

As an illustrative example, the parameter generation system may override the usual proximity rule, which typically flags messages sent from locations far from a user's home location as suspicious. During a natural disaster, people may be displaced and sending messages from unfamiliar locations, so the parameter generation system may temporarily relax or disable the proximity parameter to avoid incorrectly flagging legitimate messages as malicious. In some embodiments, the parameter generation system may also implement override rules for other features, such as message frequency or sender reputation, if it detects that the current context warrants a more permissive approach. For example, if a large number of users are sending frequent messages to coordinate relief efforts, the parameter generation system may increase the allowable message frequency threshold to prevent unnecessary disruptions. These override rules may be automatically activated and deactivated based on predefined triggers or real-time analysis of external data.

The parameter generation system may generate, in real time or near real time for an updated plurality of messages as each message is received, the updated set of outputs for the target feature based on the updated set of parameters. For example, as new messages arrive, the parameter generation system may immediately extract the relevant features from each message and apply the most recent set of parameters (e.g., including override rules or adjusted thresholds) derived from the updated decision tree. For example, if the updated set of parameters includes a higher threshold for message frequency and a relaxed proximity rule due to an ongoing natural disaster, the parameter generation system may evaluate each incoming message against these new criteria. If a message is sent from a location far from the sender's usual home location but during a period when the override rule is active, the parameter generation system may classify the message as benign, even though it would have been flagged as suspicious under normal circumstances. Conversely, if a message still meets the criteria for being classified as malicious—such as containing high-risk keywords or coming from a sender with a poor reputation—the parameter generation system may continue to block it accordingly. This real-time or near real-time processing capability may be essential for maintaining both security and user experience, as it allows the parameter generation system to respond quickly to changing conditions and to apply the most contextually appropriate detection rules. By generating outputs for the target feature as each message is received, the parameter generation system may ensure that legitimate communications are not unnecessarily delayed or blocked while still providing robust protection against malicious activity.

The parameter generation system may apply the processes of updating decision trees and adjusting parameters individually or in various orders, depending on the specific circumstances and the metrics being monitored. For example, if the parameter generation system determines that the primary external metric—such as the rate of undetected malicious messages—is too high, it may update the existing decision tree by simply adjusting certain thresholds or feature splits rather than determining an entirely new decision tree. This approach may be more efficient when the underlying structure of the decision tree remains effective, but minor refinements are needed to improve accuracy. For example, the parameter generation system may increase the sensitivity of a particular node by lowering the threshold for message frequency, thereby capturing more potentially malicious messages without the need for a complete decision tree overhaul. In some embodiments, the parameter generation system may respond to a high dependent external metric—such as an increase in support system traffic or user complaints—by determining that a more substantial change is required. In such cases, the parameter generation system may determine an entirely new decision tree, using a new set of predictor features or a different ordering of features, to better address the root causes of the increased false positives or user disruptions. For example, if the current decision tree is causing too many legitimate messages to be flagged due to an overemphasis on message frequency, the parameter generation system may generate a new tree that prioritizes sender reputation or message content, thereby reducing unnecessary disruptions.

The flexibility to apply these processes in different orders allows the parameter generation system to adapt dynamically to evolving operational needs. In some embodiments, the parameter generation system may alternate between these approaches, first attempting to adjust thresholds within the existing decision tree and, if the desired improvements are not achieved, proceeding to determine a new decision tree altogether. This iterative and context-sensitive strategy may help the parameter generation system maintain an optimal balance between security and usability while minimizing the computational and operational overhead associated with frequent decision tree generation.

In addition to primary and dependent external metrics, the parameter generation system may also rely on other indicators or triggers to initiate these processes. For example, the parameter generation system may monitor for sudden changes in message patterns, such as spikes in message volume, the emergence of new types of content, or shifts in sender behavior. External events, such as holidays, major news events, or natural disasters, may also serve as triggers for the parameter generation system to review and potentially update its detection rules. Furthermore, feedback from manual reviews, threat intelligence feeds, or integration with other security systems may prompt the parameter generation system to adjust its parameters or decision trees proactively, even before external metrics reach critical thresholds.

In some embodiments, the parameter generation system may be applicable to the context of detecting fraud in financial transactions. In this setting, the parameter generation system may continuously monitor streams of transaction data, extracting relevant predictor features such as transaction amount, frequency, geographic location, device information, and historical account behavior. By analyzing these features, the parameter generation system may construct decision trees that classify each transaction as either potentially fraudulent or legitimate, using parameters derived from the most predictive features. As fraudulent tactics evolve, the parameter generation system may dynamically adjust its detection rules to maintain high accuracy. For example, if the primary external metric—such as the rate of undetected fraudulent transactions—rises above an acceptable threshold, the parameter generation system may respond by updating the thresholds within the existing decision tree, such as lowering the allowable transaction amount for high-risk accounts or tightening the criteria for unusual geographic locations. If these adjustments are insufficient, the parameter generation system may generate an entirely new decision tree, possibly incorporating new features like device fingerprinting or recent login patterns, to better capture emerging fraud schemes.

The parameter generation system may also monitor dependent external metrics, such as the volume of customer complaints or the number of false positive fraud alerts. If these metrics exceed their respective thresholds, indicating that too many legitimate transactions are being flagged, the parameter generation system may relax certain parameters or generate a new decision tree that places greater emphasis on features that distinguish genuine customer behavior from fraudulent activity. For example, during periods of increased travel or holiday shopping, the parameter generation system may temporarily adjust location-based rules or transaction frequency thresholds to reduce unnecessary disruptions for legitimate customers. In addition to these primary and dependent metrics, the parameter generation system may incorporate other triggers, such as alerts from external fraud intelligence sources, sudden changes in transaction patterns, or feedback from manual reviews. Override rules may be implemented to accommodate special circumstances, such as relaxing certain parameters during known system outages or major public events that affect transaction behavior. By processing each transaction in real time or near real time, the parameter generation system may ensure that fraudulent activity is detected and addressed promptly while minimizing the impact on legitimate users.

In some embodiments, alternative machine learning models, such as neural networks, may provide another solution to the technical problems discussed herein. The parameter generation system may leverage neural networks to learn from predictor features. Neural networks include interconnected layers of artificial neurons that may process input data through a series of weighted transformations and non-linear activation functions. By adjusting these weights during training, neural networks may be able to model complex relationships and interactions among features that are not easily captured by traditional rule-based systems. In this context, the parameter generation system may use neural networks to automatically identify patterns or combinations of predictor features that are indicative of the target outcome, such as whether a message is malicious or not.

In some embodiments, the parameter generation system may train a plurality of neural networks or other machine learning models using the available predictor features and the designated target feature. Similar to the approach described for decision trees, each neural network in the plurality may be constructed to utilize a unique order or combination of a subset of the predictor features. During the training phase, the system may select different subsets of features for each neural network, and the order in which these features are presented as input may be varied to explore how feature arrangement influences the model's learning and predictive performance. For example, one neural network may be trained using features such as message frequency, sender reputation, and geographic proximity in a specific sequence, while another may use a different subset or order, such as content category, time of day, and message similarity to known malicious templates.

In some embodiments, the parameter generation system may select a plurality of predictor features for training a neural network or other machine learning model to predict a target feature. This selection process may be informed by a historical dataset that records how various predictor features have contributed to the values of the target feature in past instances. The system may analyze the historical dataset to identify which features have demonstrated significant predictive power or correlation with the target outcome, such as whether a message is classified as "malicious" or "not malicious." For example, the system may compute statistical measures such as mutual information, correlation coefficients, or feature importance scores derived from previous models to assess the relevance of each predictor feature. Based on these analyses, the parameter generation system may prioritize features that have consistently shown strong contributions to accurate predictions in the historical data.

Once the parameter generation system has selected a subset of predictor features based on their historical contributions to the target feature, this subset may be used as the input variables for training a neural network or other machine learning model. The training process may involve providing the neural network with a training dataset in which each data instance includes values for the selected predictor features as well as the corresponding value of the target feature (such as "malicious" or "not malicious"). During training, the neural network may learn to map combinations of predictor feature values to the target outcome by adjusting its internal parameters—such as weights and biases—through iterative optimization techniques like stochastic gradient descent. This process may enable the neural network to capture complex relationships and patterns within the data, ultimately allowing it to make accurate predictions about the target feature when presented with new, unseen data.

In some embodiments, the parameter generation system may train a plurality of neural networks using the predictor features and a target feature. The training process for each neural network may involve feeding the selected predictor features and corresponding target labels (e.g., "malicious" or "not malicious") into the network, allowing it to iteratively adjust its internal weights through optimization algorithms. This process may enable each neural network to learn complex, nonlinear relationships between the input features and the target outcome. By generating a diverse set of neural networks, each with a unique feature subset and order, the parameter generation system may increase the likelihood of discovering models that are particularly well-suited to identifying subtle or previously unrecognized patterns in the data. This approach may also help mitigate the risk of overfitting to a narrow set of highly predictive features, as the diversity of models encourages the exploration of alternative predictive pathways, much like the strategy employed with decision trees.

As an illustrative example, the parameter generation system may include 13 available predictor features, and it may be tasked with training neural networks that each use a subset of 10 of these features. The number of unique ways to choose 10 features from 13 is given by the mathematical combination "13 choose 10," or 286. For example, the parameter generation system may generate 286 different combinations of 10 features (e.g., 286 different neural networks). Furthermore, for each combination, the parameter generation system may consider every possible unique order in which those 10 features may be arranged within a neural network. For example, one neural network may use the features A, B, C, D, E, F, G, H, I, and J in a specific order, while another may use the same set of features but in a different order, such as J, I, H, G, F, E, D, C, B, and A.

After training, the system may evaluate the performance of each neural network on validation data to determine which combinations of features and feature orders yield the most accurate and reliable predictions. The results from this plurality of models may then be used to inform future steps, such as model selection or the extraction of interpretable parameters. In some embodiments, interpretability techniques—such as feature importance analysis or layer-wise relevance propagation—may be applied to the trained neural networks to identify which features or combinations thereof are most influential in the model's decision-making process, thereby supporting the generation of actionable rules or thresholds.

In some embodiments, the parameter generation system may evaluate each neural network or machine learning model in the plurality by applying one or more accuracy metrics to assess predictive performance. These accuracy metrics may include, for example, overall classification accuracy, precision, recall, F1 score, or area under the receiver operating characteristic (ROC) curve, depending on the specific requirements of the malicious message detection task. For example, the parameter generation system may use overall classification accuracy to measure the proportion of all predictions made by the neural network that are correct, providing a general indication of performance across all classes. Precision may refer to the proportion of positive predictions that are actually correct, helping the system assess how reliably the neural network identifies instances of the target feature. Recall may represent the proportion of actual positive instances that the neural network successfully detects, indicating the system's ability to capture all relevant cases. The F1 score may serve as a balanced metric that combines both precision and recall, offering a single value that reflects the trade-off between these two metrics. In some embodiments, the system may evaluate the area under the ROC curve to quantify the neural network's ability to distinguish between classes across various thresholds, with a higher area under the ROC curve suggesting better overall discriminative performance. In some embodiments, other metrics may be used to assess the neural network. During this evaluation phase, each trained neural network may be tested on a validation or holdout dataset that w as not used during training, ensuring that the assessment reflects the model's ability to generalize to new, unseen data.

The system may then compare the accuracy metrics across all neural networks in the plurality, each of which was trained using a unique order or subset of predictor features. Based on these metrics, the parameter generation system may select the neural network that demonstrates the highest or most suitable performance according to the chosen criteria. For example, if minimizing false positives is a priority, the system may prioritize models with higher precision; if overall detection is more important, the system may select the model with the highest F1 score. This selection process may be similar to the approach used for decision trees, in which the most accurate or reliable tree is chosen from a diverse set of candidates generated using different feature combinations and orders.

After the neural network has been trained using the selected predictor features and training dataset, the parameter generation system may extract a plurality of weights corresponding to the various layers of the neural network. These weights may represent the learned parameters that define how input features are transformed and combined as data passes through each layer of the model. In the context of a machine learning model, extracting these weights may provide insight into the internal representations and decision-making processes of the network. For example, the extracted weights from different layers may be analyzed to understand which features or combinations of features are most influential in predicting the target outcome.

Once the plurality of weights has been extracted from the trained neural network, the parameter generation system may generate a set of parameters for determining the target feature based on these weights. These parameters may encapsulate the learned relationships between the predictor features and the target outcome, translating the neural network's internal representations into decision criteria. For example, the set of parameters may include the specific weight values and any associated thresholds or activation functions that are necessary for the model to make predictions about new data. In the context of a machine learning model, this set of parameters may be applied to messages in real time or near real time to determine the target feature, such as whether each message is "malicious" or "not malicious."

As each message is received, the parameter generation system may use the previously generated set of parameters to evaluate the message and generate a set of outputs for the target feature. This process may involve applying the extracted weights and associated model parameters to the input features of each message, allowing the machine learning model to compute a classification for the target feature. For example, the system may process the relevant attributes of each incoming message—such as content, sender reputation, or frequency—and use the model to determine whether the message is "malicious" or "not malicious." The outputs generated for each message may provide real-time or near real-time assessments, supporting decision-making and risk mitigation.

Based on the set of outputs generated for each message, the parameter generation system may determine which predictor features are contributing to a primary value of a primary external metric that exceeds a specified threshold over a certain time period. The primary value may represent a performance indicator, such as the accuracy level of the model's predictions, and the primary external metric may be an evaluation criterion like error rate or misclassification rate. If the primary value indicates that the set of outputs has an accuracy level that does not meet the required threshold for the designated time period, the system may analyze the outputs in relation to the input features to identify which predictor features are most associated with the observed performance shortfall. For example, the system may track which features are most frequently present in misclassified messages or which features' values correlate with lower prediction accuracy, thereby highlighting areas where the model may require adjustment or retraining.

If the analysis reveals that the accuracy level of the model's outputs does not meet the required threshold for a certain time period, the parameter generation system may generate and train a new neural network using the identified set of predictor features and the available training dataset. This process may involve selecting the most relevant or updated predictor features that have been determined to impact model performance and then initializing a new neural network architecture tailored to the problem. The system may then use the training dataset—which may include both historical and newly labeled data—to train the new neural network, allowing it to learn improved representations and relationships between the features and the target outcome.

By retraining the model in this way, the system may adapt to changing data patterns and enhance its predictive accuracy for future messages.

When generating and training a new neural network, the parameter generation system may further cause the system to compare the set of predictor features identified as relevant to those currently utilized within the neural network. This comparison may help determine whether the existing neural network already includes the necessary set of predictor features. If the system determines that the neural network does not include the full set of required predictor features, it may proceed to generate a new neural network architecture that incorporates these features along with the target feature. Subsequently, the system may train this new neural network using a new training dataset, enabling the model to learn to predict the target feature based on the updated plurality of predictor features. This approach may ensure that the neural network remains aligned with the most informative and up-to-date features, thereby improving its predictive performance and adaptability to evolving data patterns.

If the comparison reveals that the neural network already includes the required set of predictor features, the system may generate the new neural network by adjusting one or more weights associated with these predictor features rather than altering the network's architecture. This weight adjustment process may be performed through additional training or fine-tuning, allowing the neural network to better capture the relationships between the predictor features and the target feature. The system may continue this process until the updated set of outputs from the new neural network satisfies a dependent requirement—specifically, that a dependent value of a dependent external metric is less than a dependent threshold. In some embodiments, the dependent external metric is inversely related to the primary external metric. As an illustrative example, if the dependent external metric (e.g., support system traffic) is inversely related to the primary external metric (e.g., the rate of undetected malicious messages), the parameter generation system may need to carefully balance the restrictiveness of its detection rules. For example, if the new parameters are too restrictive, they may cause an increased number of legitimate messages to be incorrectly flagged as malicious, which in turn may lead to a surge in user inquiries or complaints to the support system. Lowering the dependent external metric (e.g., support system traffic) may, in turn, cause an increase in the primary external metric (e.g., the rate of undetected malicious messages). Thus, the parameter generation system may be required to strike a balance between lowering a primary external metric and lowering a dependent external metric.

After generating and training the new neural network, the parameter generation system may use the new neural network to generate a new set of parameters for producing a new set of outputs for the target feature. This process may involve extracting a new plurality of weights from the trained neural network, where each weight corresponds to one of the predictor features in the set. The system may then generate the set of parameters by associating these extracted weights with their respective predictor features, effectively capturing the learned relationships between the input features and the target outcome. By basing the set of parameters on both the updated weights and the plurality of predictor features, the system may ensure that the new outputs reflect the most current and relevant patterns identified by the neural network, thereby improving the accuracy and reliability of predictions for the target feature.

As each new message is received, the parameter generation system may generate a new set of outputs for the target feature by applying the new set of parameters derived from the updated neural network. For example, the parameter generation system may use the extracted weights and associated predictor features to evaluate each incoming message, allowing the system to produce a classification for the target feature-such as determining whether a message is "malicious" or "not malicious." By continuously applying the new set of parameters to each message in real time, the system may ensure that its outputs remain aligned with the most recent model updates, thereby maintaining high accuracy and responsiveness in detecting or classifying messages according to the target feature. The parameter generation system may monitor the performance of the new neural network by evaluating a dependent value of the dependent external metric that is associated with the new set of outputs for the target feature. If the system determines that this dependent value exceeds a predefined dependent threshold, it may indicate that the neural network's recent outputs may not be meeting the desired performance criteria. By continuously assessing whether this metric surpasses the threshold, the system may identify when further adjustments or retraining of the neural network may be necessary to maintain or improve the accuracy and reliability of the model's predictions.

The parameter generation system may operate on a production dataset that includes the plurality of messages, where each entry in the dataset corresponds to an individual message (e.g., as shown in FIG. 4). In some embodiments, the parameter generation system may identify a segment of the production dataset according to one or more criteria, such as specific values or ranges of predictor features. For example, the criteria may divide the dataset into segments based on categories like geographic region, message type, sender reputation, or time of day. Once a segment is identified, both the neural network and the new neural network may generate their respective sets of outputs—such as predictions or classifications—specifically for that segment of the production dataset. By segmenting the data in this way, the system may tailor its analysis and model outputs to distinct subgroups within the overall dataset, which may improve the relevance and accuracy of the determinations for each category.

In some embodiments, the above embodiments may apply to fraud detection within financial transactions. In this context, the production dataset may include a plurality of transaction records, with each entry representing an individual financial transaction. The system may segment this dataset based on criteria such as transaction amount, geographic location, merchant category, or time of transaction. For example, the parameter generation system may identify a segment of transactions that occur outside a customer's usual geographic region or that exceed a certain monetary threshold. By applying the neural network and updated neural network to these specific segments, the system may generate outputs that indicate the likelihood of each transaction being fraudulent.

As an illustrative example, if a customer typically makes purchases in Seattle but suddenly a high-value transaction is detected in another country, the system may flag this transaction as potentially fraudulent. Similarly, if a series of small transactions are rapidly made at unusual hours, the system may identify this pattern as suspicious based on the segment's features. The neural network may be trained to use predictor features such as transaction frequency, merchant reputation, device fingerprint, and historical spending patterns to predict fraud. The parameter generation system may then generate rules based on the trained neural network to detect fraud in the transactions. As new data is received and the model is updated, the system may adapt to emerging fraud tactics in near real time, ensuring that the detection process remains robust and responsive. This approach may significantly reduce false positives and improve the accuracy of fraud detection, ultimately protecting both financial institutions and their customers.

Figure 6:
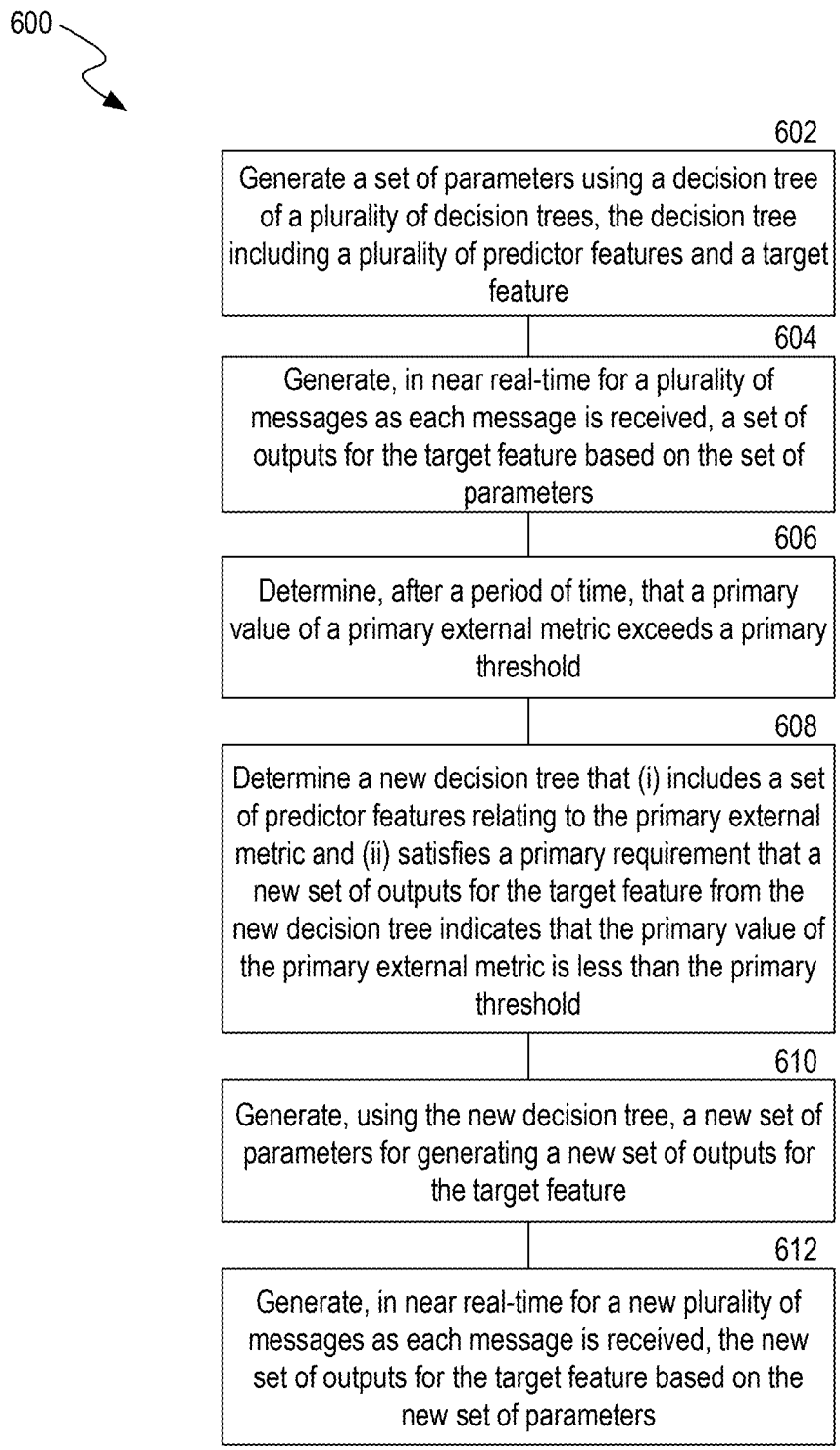
FIG. 6 is a flowchart of operations for generating parameters using decision trees, in accordance with one or more implementations of this disclosure.
Figure 8:
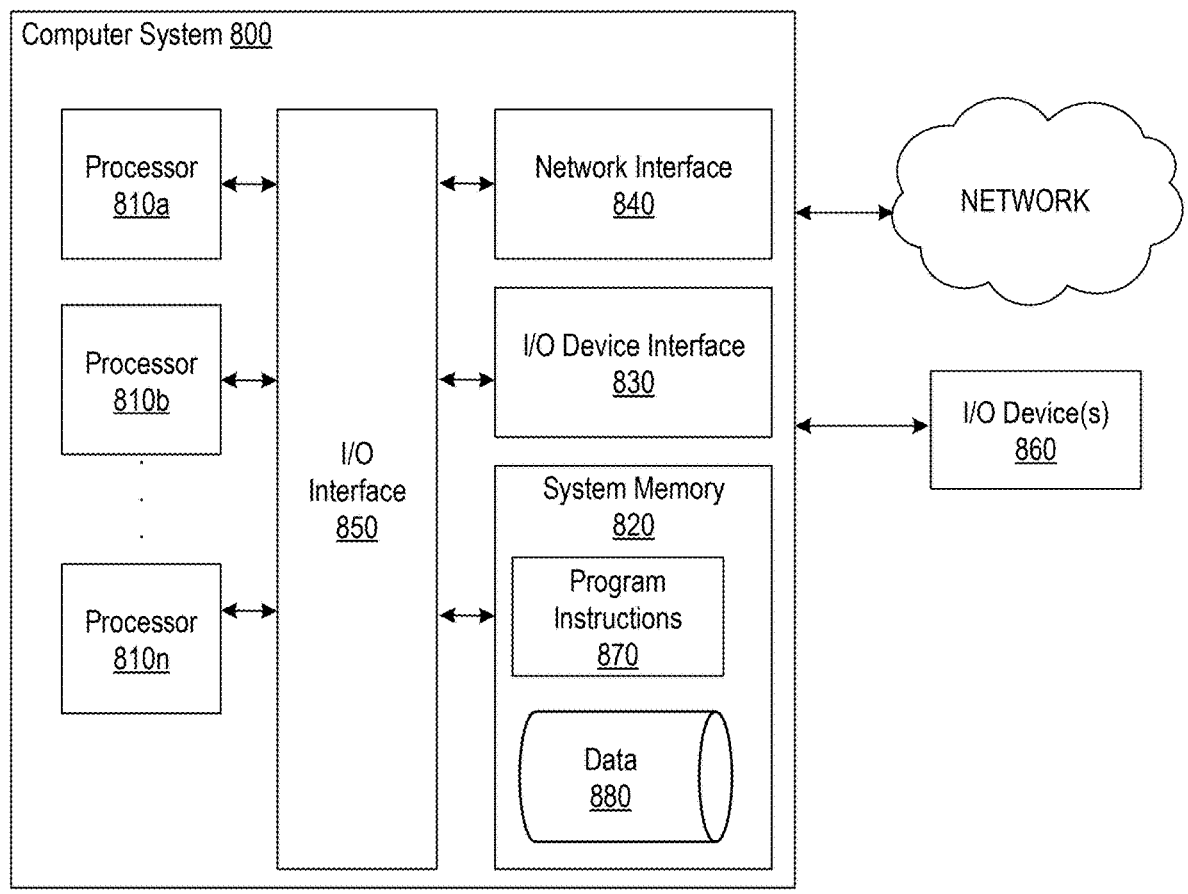
FIG. 8 illustrates an example computing system that may be used in accordance with some implementations of this disclosure.

FIG. 6 is a flowchart 600 of operations for generating parameters using decision trees, in accordance with one or more implementations of this disclosure. The operations of FIG. 6 may use components described in relation to FIGS. 1-5. In some implementations, the parameter generation system 160 may include one or more components of computer system 800, as shown in FIG. 8.

At operation 602, the parameter generation system 160 (e.g., using one or more of processors 810a-810n) may generate a set of parameters using a decision tree of a plurality of decision trees, the decision tree including a plurality of predictor features and a target feature. For example, the parameter generation system 160 may select a decision tree that uses predictor features such as message frequency, sender reputation score, and the presence of suspicious keywords, with the target feature being whether a message is classified as malicious or benign. The system may extract thresholds and split points from the tree, such as flagging messages if the frequency exceeds 100 per hour, the reputation score is below 0.4, or certain keywords are detected, and encode these as operational parameters for real-time evaluation.

At operation 604, the parameter generation system 160 (e.g., using one or more of processors 810a-810n) may generate, in near real time for a plurality of messages as each message is received, a set of outputs for the target feature based on the set of parameters. For example, as each message arrives, the parameter generation system 160 may immediately extract the relevant features—such as the sender's reputation, message content, and time of sending—and apply the previously generated parameters to classify the message. If a message is sent at 3:00 AM from a sender with a reputation score of 0.2 and contains flagged keywords, the system may output a determination of "malicious" for that message in near real time.

At operation 606, the parameter generation system 160 (e.g., using one or more of processors 810a-810n) may determine, after a period of time, that a primary value of a primary external metric exceeds a primary threshold. For example, the parameter generation system 160 may monitor the rate of undetected fraudulent transactions over a week and determine that this rate has risen above a predefined threshold, such as 5% of all transactions, indicating that the current detection parameters are not sufficiently effective and require adjustment.

At operation 608, the parameter generation system 160 (e.g., using one or more of processors 810a-810n) may determine a new decision tree that (i) includes a set of predictor features relating to the primary external metric and (ii) satisfies a primary requirement that a new set of outputs for the target feature from the new decision tree indicates that the primary value of the primary external metric is less than the primary threshold. For example, the parameter generation system 160 may retrain or select a new decision tree that incorporates features such as device geolocation, transaction amount, and historical user behavior and validate that the outputs from this tree, when applied to recent data, reduce the fraud rate below the 5% threshold.

At operation 610, the parameter generation system 160 (e.g., using one or more of processors 810a-810n) may generate, using the new decision tree, a new set of parameters for generating a new set of outputs for the target feature. For example, the parameter generation system 160 may extract new thresholds and rules from the updated decision tree, such as increasing the minimum acceptable sender reputation to 0.5, lowering the message frequency threshold to 80 per hour, and updating the list of high-risk keywords, and encode these as the new operational parameters for message evaluation.

At operation 612, the parameter generation system 160 (e.g., using one or more of processors 810a-810n) may generate, in near real time for a new plurality of messages as each message is received, the new set of outputs for the target feature based on the new set of parameters. For example, as new messages are received, the parameter generation system 160 may immediately apply the updated parameters to each message, extracting features such as sender reputation, message content, and frequency, and outputting a real-time determination of "malicious" or "benign" based on the refined detection rules.

Figure 7:
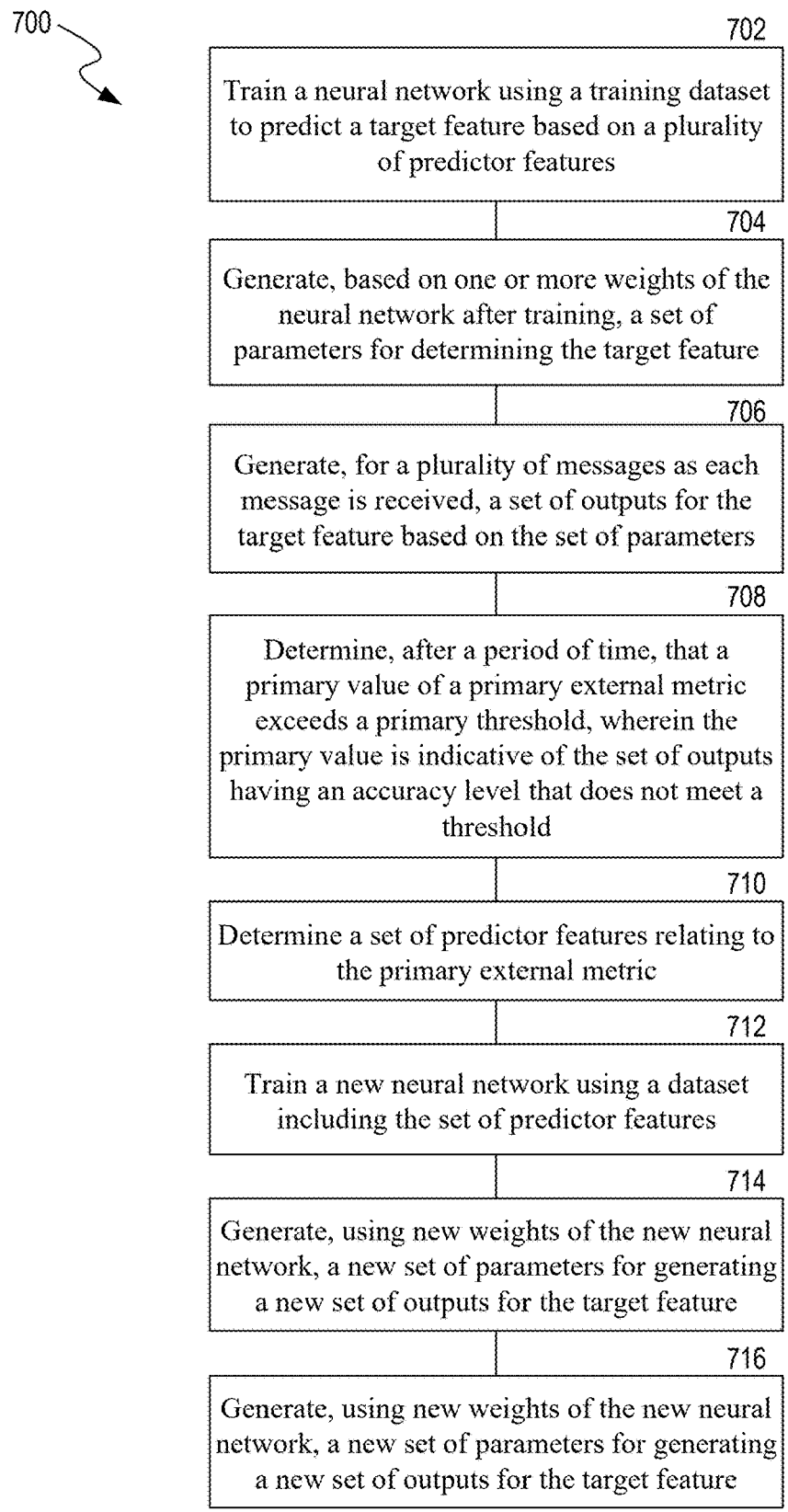
FIG. 7 is a flowchart of operations for generating parameters using neural networks, in accordance with one or more implementations of this disclosure.

FIG. 7 is a flowchart 700 of operations for generating parameters using neural networks, in accordance with one or more implementations of this disclosure. The operations of FIG. 7 may use components described in relation to FIGS. 1-5. In some implementations, the parameter generation system 160 may include one or more components of computer system 800, as shown in FIG. 8.

At operation 702, the parameter generation system 160 (e.g., using one or more of processors 810a-810n) may train a neural network using a training dataset to predict a target feature based on a plurality of predictor features. For example, the system may use a supervised learning approach in which the training dataset includes labeled examples, such as messages annotated as "malicious" or "not malicious." The neural network may be constructed with multiple layers (e.g., input, hidden, and output layers), and during training, the system may use backpropagation and stochastic gradient descent to iteratively adjust the network's weights to minimize a loss function, such as binary cross-entropy, thereby improving the model's ability to predict the target feature from the input predictor features.

At operation 704, the parameter generation system 160 (e.g., using one or more of processors 810a-810n) may generate, based on one or more weights of the neural network after training, a set of parameters for determining the target feature. For example, after the neural network has been trained, the system may extract the learned weights from each layer of the network and use these as the set of parameters. These parameters may include the weight matrices and bias vectors for each layer, which together define how input features are transformed through the network to produce the final prediction for the target feature.

At operation 706, the parameter generation system 160 (e.g., using one or more of processors 810a-810n) may generate, for a plurality of messages as each message is received, a set of outputs for the target feature based on the set of parameters. For example, as each message arrives, the system may preprocess the message to extract the relevant predictor features, then apply the trained neural network (using the extracted parameters) to compute the output, such as a probability score or classification label indicating whether the message is likely to be "malicious" or "not malicious."

At operation 708, the parameter generation system 160 (e.g., using one or more of processors 810a-810n) may determine, after a period of time, that a primary value of a primary external metric exceeds a primary threshold, where the primary value is indicative of the set of outputs having an accuracy level that does not meet a threshold. For example, the system may monitor the model's performance over a rolling window and calculate an external metric such as accuracy, precision, or recall. If the observed metric (e.g., accuracy) drops below a predefined threshold (e.g., 90%) for a specified period, the system may flag this as a trigger for model retraining or adjustment.

At operation 710, the parameter generation system 160 (e.g., using one or more of processors 810a-810n) may determine a set of predictor features relating to the primary external metric. For example, the system may analyze the relationship between each predictor feature and the primary external metric—such as accuracy, precision, or recall—by calculating feature importance scores, analyzing the magnitude of learned weights in the neural network, or using other techniques. The system may then select those predictor features that have the greatest impact on the primary external metric, such as features whose removal leads to a significant drop in model performance, thereby identifying which aspects of the input data are most influential in achieving high predictive accuracy.

At operation 712, the parameter generation system 160 (e.g., using one or more of processors 810a-810n) may train a new neural network using a dataset including the set of predictor features. For example, the system may initialize a new neural network architecture, possibly with updated hyperparameters or additional layers, and use the latest available dataset—containing the most relevant predictor features and updated labels—to train the model from scratch or fine-tune it, employing techniques such as early stopping or regularization to prevent overfitting.

At operation 714, the parameter generation system 160 (e.g., using one or more of processors 810a-810n) may generate, using new weights of the new neural network, a new set of parameters for generating a new set of outputs for the target feature. For example, after training the new neural network, the system may extract the updated weight matrices and bias vectors from each layer and use these as the new set of parameters for inference, ensuring that future predictions leverage the most recent learning from the updated training data.

At operation 716, the parameter generation system 160 (e.g., using one or more of processors 810a-810n) may generate, using new weights of the new neural network, a new set of parameters for generating a new set of outputs for the target feature. For example, after the new neural network has been trained, the system may extract the learned weights from each layer of the new neural network and use these as the set of parameters. These parameters may include the weight matrices and bias vectors for each layer, which together define how input features are transformed through the network to produce the final prediction for the target feature.

Although the present invention has been described in detail for the purpose of illustration based on what is currently considered to be the most practical and preferred implementations, it is to be understood that such detail is solely for that purpose and that the invention is not limited to the disclosed implementations but, on the contrary, is intended to cover modifications and equivalent arrangements that are within the scope of the appended claims. For example, it is to be understood that the present invention contemplates that, to the extent possible, one or more features of any implementation may be combined with one or more features of any other implementation.

The above-described implementations of the present disclosure are presented for purposes of illustration, not of limitation, and the present disclosure is limited only by the claims that follow. Furthermore, it should be noted that the features and limitations described in any one implementation may be applied to any other implementation herein, and flowcharts or examples relating to one implementation may be combined with any other implementation in a suitable manner, done in different orders, or done in parallel. In addition, the systems and methods described herein may be performed in real time. It should also be noted that the systems or methods described above may be applied to, or used in accordance with, other systems or methods.

FIG. 8 shows an example computing system that may be used in accordance with some implementations of this disclosure. In some instances, computing system 800 is referred to as a computer system 800. A person skilled in the art would understand that those terms may be used interchangeably. The components of FIG. 8 may be used to perform some or all operations discussed in relation to FIGS. 1-7. Furthermore, various portions of the systems and methods described herein may include or be executed on one or more computer systems similar to computing system 800. Further, processes and modules described herein may be executed by one or more processing systems similar to that of computing system 800.

Computing system 800 may include one or more processors (e.g., processors 810a-810n) coupled to system memory 820, an input/output (I/O) device interface 830, and a network interface 840 via an I/O interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 800. A processor may execute code (e.g., processor firmware, a protocol stack, a database management system, an operating system, or a combination thereof) that creates an execution environment for program instructions.

A processor may include a programmable processor. A processor may include general or special-purpose microprocessors. A processor may receive instructions and data from a memory (e.g., system memory 820). Computing system 800 may be a uni-processor system including one processor (e.g., processor 810a) or a multiprocessor system including any number of suitable processors (e.g., 810a-810n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special-purpose logic circuitry, e.g., an FPGA (field-programmable gate array) or an ASIC (application-specific integrated circuit). Computing system 800 may include a plurality of computing devices (e.g., distributed computer systems) to implement various processing functions.

I/O device interface 830 may provide an interface for connection of one or more I/O devices 860 to computer system 800. I/O devices may include devices that receive input (e.g., from a user) or output information (e.g., to a user). I/O devices 860 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computer system 800 through a wired or wireless connection. I/O devices 860 may be connected to computer system 800 from a remote location. I/O devices 860 located on remote computer systems, for example, may be connected to computer system 800 via a network and network interface 840.

The I/O device interface 830 and I/O devices 860 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, or the like. Alternatively or additionally, the user may use their voice to indicate specific nodes, specific models, or the like via the voice recognition device or microphones.

Network interface 840 may include a network adapter that provides for connection of computer system 800 to a network. Network interface 840 may facilitate data exchange between computer system 800 and other devices connected to the network. Network interface 840 may support wired or wireless communication. The network may include an electronic communication network, such as the internet, a LAN, a WAN, a cellular communications network, or the like.

System memory 820 may be configured to store program instructions 870 or data 880. Program instructions 870 may be executable by a processor (e.g., one or more of processors 810a-810n) to implement one or more implementations of the present techniques. Program instructions 870 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 820 may include a non-transitory, computer-readable storage medium that may have program instructions stored thereon that are executable by a computer processor (e.g., one or more of processors 810a-810n) to cause the subject matter and the functional operations described herein. A memory (e.g., system memory 820) may include a single memory device or a plurality of memory devices (e.g., distributed memory devices).

I/O interface 850 may be configured to coordinate I/O traffic between processors 810a-810n, system memory 820, network interface 840, I/O devices 860, or other peripheral devices. I/O interface 850 may perform protocol, timing, or other data transformations to convert data signals from one component (e.g., system memory 820) into a format suitable for use by another component (e.g., processors 810a-810n). I/O interface 850 may include support for devices attached through various types of peripheral buses, such as a variant of the Peripheral Component Interconnect (PCI) bus standard or the Universal Serial Bus (USB) standard.

Implementations of the techniques described herein may be implemented using a single instance of computer system 800 or multiple computer systems 800 configured to host different portions or instances of implementations. Multiple computer systems 800 may provide for parallel or sequential processing/execution of one or more portions of the techniques described herein.

Those skilled in the art will appreciate that computer system 800 is merely illustrative and is not intended to limit the scope of the techniques described herein. Computer system 800 may include any combination of devices or software that may perform or otherwise provide for the performance of the techniques described herein. For example, computer system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 800 may also be connected to other devices that are not illustrated or may operate as a stand-alone system. In addition, the functionality provided by the illustrated components may, in some implementations, be combined in fewer components or be distributed in additional components. Similarly, in some implementations, the functionality of some of the illustrated components may not be provided, or other additional functionality may be available.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements may be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples; alternative implementations may employ differing values or ranges.

The teachings of the technology provided herein may be applied to other systems, not necessarily the system described above. The elements and acts of the various examples described above may be combined to provide further implementations of the technology. Some alternative implementations of the technology may include not only additional elements to those implementations noted above but also may include fewer elements.

These and other changes may be made to the technology in light of the above Detailed Description. While the above description describes certain examples of the technology, and describes the best mode contemplated, no matter how detailed the above appears in text, the technology may be practiced in many ways. Details of the system may vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

What is claimed is:

1. A system for generating parameters using decision trees, the system comprising:
    a storage device; and
    one or more processors in a network system communicatively coupled to the storage device, wherein the one or more processors execute instructions that are stored in the storage device to cause the system to:
        generate a plurality of decision trees using a plurality of predictor features and a target feature, wherein each of the plurality of decision trees is generated for predicting the target feature using a unique order of a subset of the plurality of predictor features;
        select, based on accuracy metrics associated with each decision tree of the plurality of decision trees, a preferred decision tree of the plurality of decision trees;
        generate, using the preferred decision tree, a set of parameters, wherein the set of parameters is used to determine the target feature;
        generate, in near real time for a plurality of messages as each message is received, a set of outputs for the target feature based on the set of parameters;
        determine, after a period of time, that a primary value of a primary external metric exceeds a primary threshold, wherein the primary value is indicative of the set of outputs having an accuracy level that does not meet an accuracy threshold;
        determine a set of predictor features relating to the primary external metric;
        determine a new decision tree that (i) comprises the set of predictor features and (ii) satisfies a primary requirement that a new set of outputs for the target feature from the new decision tree indicates that the primary value of the primary external metric is less than the primary threshold;
        generate, using the new decision tree, a new set of parameters for generating a new set of outputs for the target feature;
        generate, in near real time for a new plurality of messages as each message is received, the new set of outputs for the target feature based on the new set of parameters; and
        based on the new set of outputs satisfying the primary requirement, continue to process incoming messages to determine whether to accept or reject each message.

2. The system of claim 1, wherein the instructions for determining the new decision tree further cause the system to:
    compare the set of predictor features to predictor features within each decision tree of the plurality of decision trees;
    based on the comparison, determine whether an existing decision tree of the plurality of decision trees comprises the set of predictor features; and
    based on determining that the existing decision tree of the plurality of decision trees comprises the set of predictor features, determine that the existing decision tree is the new decision tree.

3. The system of claim 1, wherein the instructions for determining the new decision tree further cause the system to:
    compare the set of predictor features to the plurality of decision trees;

based on the comparison, determine whether an existing decision tree of the plurality of decision trees comprises the set of predictor features; and based on determining that none of the decision trees of the plurality of decision trees comprises the set of predictor features:

generate a new plurality of decision trees using the set of predictor features and the target feature; and select the new decision tree of the new plurality of decision trees based on the new decision tree generating sets of outputs, for a testing dataset, having higher corresponding accuracy metrics than other sets of outputs generated by other decision trees of the new plurality of decision trees.

4. The system of claim 1, wherein the instructions further cause the system to:

determine that a dependent value of a dependent external metric exceeds a dependent threshold, wherein the dependent value is associated with the new set of outputs for the target feature from the new decision tree;

generate an updated decision tree by adjusting one or more values of one or more predictor features of the set of predictor features of the new decision tree, wherein the updated decision tree satisfies a dependent requirement that an updated set of outputs from the updated decision tree is indicative of the dependent value being less than the dependent threshold, wherein the dependent external metric is inversely related to the primary external metric;

generate, using the updated decision tree, an updated set of parameters for generating the updated set of outputs for the target feature; and generate, in near real time for an updated plurality of messages as each message is received, the updated set of outputs for the target feature based on the updated set of parameters.

5. The system of claim 1, wherein the instructions for selecting the preferred decision tree of the plurality of decision trees further cause the system to select the preferred decision tree that generates sets of outputs, for a testing dataset, having higher corresponding accuracy metrics than other sets of outputs generated by other decision trees of the plurality of decision trees.

6. The system of claim 5, wherein the instructions further cause the system to identify a segment of the testing dataset based on one or more criteria, wherein the preferred decision tree generates the sets of outputs, based on the segment of the testing dataset, having higher corresponding accuracy metrics than the other sets of outputs generated by the other decision trees of the plurality of decision trees.

7. The system of claim 1, wherein the plurality of messages corresponds to a first plurality of entries of a testing dataset, and wherein each output of the set of outputs comprises a prediction for the target feature for a corresponding entry of the first plurality of entries.

8. The system of claim 7, wherein the new plurality of messages corresponds to a second plurality of entries of the testing dataset, and wherein each output of the set of outputs comprises a new prediction for the target feature for a new corresponding entry of the second plurality of entries.

9. A method comprising:

generating a set of parameters using a decision tree of a plurality of decision trees, wherein the decision tree comprises a plurality of predictor features and a target feature, and wherein the decision tree was selected from a plurality of decision trees based on accuracy of predictions;

generating, for a plurality of messages as each message is received, a set of outputs for the target feature based on the set of parameters, wherein the set of parameters is used to determine a corresponding output for each message of the plurality of messages;

determining, after a period of time, that a primary value of a primary external metric exceeds a primary threshold, wherein the primary value is indicative of the set of outputs having an accuracy level that does not meet an accuracy threshold;

determining a new decision tree that (i) comprises a set of predictor features relating to the primary external metric and (ii) satisfies a primary requirement that a new set of outputs for the target feature from the new decision tree indicates that the primary value of the primary external metric is less than the primary threshold;

generating, using the new decision tree, a new set of parameters for generating a new set of outputs for the target feature; and generating, for a new plurality of messages as each message is received, the new set of outputs for the target feature based on the new set of parameters.

10. The method of claim 9, further comprising:

generating the plurality of decision trees using the plurality of predictor features and the target feature, wherein each of the plurality of decision trees is generated for predicting the target feature using a unique order of a subset of the plurality of predictor features; and selecting, based on accuracy metrics associated with each decision tree of the plurality of decision trees, the decision tree of the plurality of decision trees.

11. The method of claim 9, wherein determining the new decision tree further comprises:

comparing the set of predictor features to predictor features within each decision tree of the plurality of decision trees;

based on the comparison, determining whether an existing decision tree of the plurality of decision trees comprises the set of predictor features; and based on determining that the existing decision tree of the plurality of decision trees comprises the set of predictor features, determining that the existing decision tree is the new decision tree.

12. The method of claim 9, wherein determining the new decision tree further comprises:

comparing the set of predictor features to the plurality of decision trees;

based on the comparison, determining whether an existing decision tree of the plurality of decision trees comprises the set of predictor features; and based on determining that none of the decision trees of the plurality of decision trees comprises the set of predictor features:

generating a new plurality of decision trees using the set of predictor features and the target feature; and selecting the new decision tree of the new plurality of decision trees based on the new decision tree generating sets of outputs, for a testing dataset, having higher corresponding accuracy metrics than other sets of outputs generated by other decision trees of the new plurality of decision trees.

13. The method of claim 12, further comprising:
   determining that a dependent value of a dependent external metric exceeds a dependent threshold, wherein the dependent value is associated with the new set of outputs for the target feature from the new decision tree;
   generating an updated decision tree by adjusting one or more values of one or more predictor features of the set of predictor features of the new decision tree, wherein the updated decision tree satisfies a dependent requirement that an updated set of outputs from the updated decision tree is indicative of the dependent value being less than the dependent threshold, wherein the dependent external metric is inversely related to the primary external metric;
   generating, using the updated decision tree, an updated set of parameters for generating the updated set of outputs for the target feature; and
   generating, in near real time for an updated plurality of messages as each message is received, the updated set of outputs for the target feature based on the updated set of parameters.

14. One or more non-transitory, computer-readable media storing instructions thereon, wherein the instructions cause one or more processors to perform operations comprising:
   generating a set of parameters using a decision tree of a plurality of decision trees, the decision tree comprising a plurality of predictor features and a target feature, wherein the set of parameters is used to determine the target feature;
   generating, in near real time for a plurality of messages as each message is received, a set of outputs for the target feature based on the set of parameters;
   determining, after a period of time, that a primary value of a primary external metric exceeds a primary threshold, wherein the primary value is indicative of the set of outputs having an accuracy level that does not meet an accuracy threshold;
   determining a new decision tree that (i) comprises a set of predictor features relating to the primary external metric and (ii) satisfies a primary requirement that a new set of outputs for the target feature from the new decision tree indicates that the primary value of the primary external metric is less than the primary threshold;
   generating, using the new decision tree, a new set of parameters for generating a new set of outputs for the target feature; and
   generating, in near real time for a new plurality of messages as each message is received, the new set of outputs for the target feature based on the new set of parameters.

15. The one or more non-transitory, computer-readable media of claim 14, wherein the instructions further cause one or more processors to perform operations comprising:
   generating the plurality of decision trees using the plurality of predictor features and the target feature, wherein each of the plurality of decision trees is generated for predicting the target feature using a unique order of a subset of the plurality of predictor features; and
   selecting, based on accuracy metrics associated with each decision tree of the plurality of decision trees, the decision tree of the plurality of decision trees.

16. The one or more non-transitory, computer-readable media of claim 14, wherein the instructions for determining the new decision tree further cause one or more processors to perform operations comprising:
   comparing the set of predictor features to predictor features within each decision tree of the plurality of decision trees;
   based on the comparison, determining whether an existing decision tree of the plurality of decision trees comprises the set of predictor features; and
   based on determining that the existing decision tree of the plurality of decision trees comprises the set of predictor features, determining that the existing decision tree is the new decision tree.

17. The one or more non-transitory, computer-readable media of claim 14, wherein the instructions for determining the new decision tree further cause one or more processors to perform operations comprising:
   comparing the set of predictor features to the plurality of decision trees;
   based on the comparison, determining whether an existing decision tree of the plurality of decision trees comprises the set of predictor features; and
   based on determining that none of the decision trees of the plurality of decision trees comprises the set of predictor features:
      generating a new plurality of decision trees using the set of predictor features and the target feature; and
      selecting the new decision tree of the new plurality of decision trees based on the new decision tree generating sets of outputs, for a testing dataset, having higher corresponding accuracy metrics than other sets of outputs generated by other decision trees of the new plurality of decision trees.

18. The one or more non-transitory, computer-readable media of claim 14, wherein the instructions further cause one or more processors to perform operations comprising:
   determining that a dependent value of a dependent external metric exceeds a dependent threshold, wherein the dependent value is associated with the new set of outputs for the target feature from the new decision tree;
   generating an updated decision tree by adjusting one or more values of one or more predictor features of the set of predictor features of the new decision tree, wherein the updated decision tree satisfies a dependent requirement that an updated set of outputs from the updated decision tree is indicative of the dependent value being less than the dependent threshold, wherein the dependent external metric is inversely related to the primary external metric;
   generating, using the updated decision tree, an updated set of parameters for generating the updated set of outputs for the target feature; and
   generating, in near real time for an updated plurality of messages as each message is received, the updated set of outputs for the target feature based on the updated set of parameters.

19. The one or more non-transitory, computer-readable media of claim 14, wherein the instructions for selecting the decision tree of the plurality of decision trees further cause one or more processors to perform operations comprising selecting the decision tree that generates sets of outputs, for a testing dataset, having higher corresponding accuracy metrics than other sets of outputs generated by other decision trees of the plurality of decision trees.

20. The one or more non-transitory, computer-readable media of claim 19, wherein the instructions further cause one or more processors to perform operations comprising identifying a segment of the testing dataset based on one or more criteria, wherein the decision tree generates the sets of outputs, based on the segment of the testing dataset, having higher corresponding accuracy metrics than the other sets of outputs generated by the other decision trees of the plurality of decision trees.

\* \* \* \* \*